(12) United States Patent
Chentnik et al.

(10) Patent No.: US 11,489,484 B2
(45) Date of Patent: Nov. 1, 2022

(54) UTILITY POLE SOLAR ENERGY COLLECTOR SYSTEM

(71) Applicant: Vertical Solar Systems LLC, Crawfordville, FL (US)

(72) Inventors: Matthew Chentnik, Crawfordville, FL (US); Thomas Chentnik, Roanoke, TX (US); Brendan Eric Draper, Tallahassee, FL (US); Lonnie Mark Draper, Tallahassee, FL (US)

(73) Assignee: Vertical Solar Systems LLC, Crawfordville, FL (US)

( * ) Notice: Subject to any disclaimer, the term of this patent is extended or adjusted under 35 U.S.C. 154(b) by 180 days.

(21) Appl. No.: 16/858,371

(22) Filed: Apr. 24, 2020

(65) Prior Publication Data
US 2020/0343852 A1 Oct. 29, 2020

Related U.S. Application Data
(60) Provisional application No. 62/838,558, filed on Apr. 25, 2019.

(51) Int. Cl.
*H02S 20/10* (2014.01)
*H02S 20/32* (2014.01)
(Continued)

(52) U.S. Cl.
CPC .............. *H02S 20/32* (2014.12); *F21S 8/085* (2013.01); *H02J 3/381* (2013.01); *H02S 40/32* (2014.12);
(Continued)

(58) Field of Classification Search
CPC ....... H01L 31/00–078; Y02E 10/50–60; H02S 20/00–32; H02S 30/00–20; H02S 40/20–22
(Continued)

(56) References Cited

U.S. PATENT DOCUMENTS 9,196,770 B2    11/2015   Newdoll et al.
10,020,657 B2    7/2018   Newdoll et al.
(Continued)

FOREIGN PATENT DOCUMENTS

CN    107642456    * 1/2018
JP    2011295751   * 10/2001
(Continued)

OTHER PUBLICATIONS

JP2001295751 English translation (Year: 2001).*
(Continued)

*Primary Examiner* — Bach T Dinh
(74) *Attorney, Agent, or Firm* — McHale & Slavin, P.A.

(57) ABSTRACT

A solar energy harvesting assembly having a unique attachment that can be arranged, mounted, moved and attached to new or existing structures. Solar rings are mounted on any vertical structure that may benefit from solar power using an aesthetically pleasing design that is resistant to wind load. The assembly does not require the need for pitch, azimuth or bearing measurements. The assembly is also capable of energy harvesting from reflected light below with the use of bifacial photovoltaic panels. The mounting design allows the solar energy harvest device to be installed on any vertical structure, including light poles, power poles, parking structures and other minimal load bearing structures. Further, the assembly can be attached to water towers, existing radio towers (guyed, monopole, stealth, self-supporting towers) all used to create vast amounts of unshaded vertical space for solar energy harvesting.

12 Claims, 14 Drawing Sheets

(51) Int. Cl.
*H02S 40/32* (2014.01)
*H02S 40/38* (2014.01)
*F21S 8/08* (2006.01)
*H02J 3/38* (2006.01)
*F21W 131/103* (2006.01)

(52) U.S. Cl.
CPC ....... *H02S 40/38* (2014.12); *F21W 2131/103* (2013.01); *H02J 2300/24* (2020.01)

(58) Field of Classification Search
USPC .................................................. 136/243–265
See application file for complete search history.

(56) References Cited

U.S. PATENT DOCUMENTS

| | | | |
|---|---|---|---|
| 2004/0261334 A1* | 12/2004 | Liebendorfer | F24S 25/35 52/173.1 |
| 2010/0183443 A1* | 7/2010 | Thorne | H02S 10/12 136/244 |
| 2010/0237305 A1 | 9/2010 | Miller | |
| 2010/0328932 A1 | 12/2010 | Fogerlie | |
| 2011/0005583 A1 | 1/2011 | Thomas | |
| 2011/0017256 A1 | 1/2011 | Stevens | |
| 2011/0041834 A1 | 2/2011 | Liao | |
| 2011/0073161 A1 | 3/2011 | Scanlon | |
| 2011/0085322 A1 | 4/2011 | Myer | |
| 2011/0163222 A1 | 7/2011 | Moser | |
| 2011/0192460 A1 | 8/2011 | Tan | |
| 2013/0081671 A1* | 4/2013 | Hui | H01L 31/0547 136/255 |

FOREIGN PATENT DOCUMENTS

| | | | |
|---|---|---|---|
| JP | 2011035176 | * | 2/2011 |
| KR | 20100009905 | * | 10/2010 |
| KR | 2013123521 | * | 11/2013 |

OTHER PUBLICATIONS

CN 107642456 English translation (Year: 2018).*
JP2011035176 English translation (Year: 2011).*
KR2013123521 English translation (Year: 2013).*

* cited by examiner

Fig. 10A
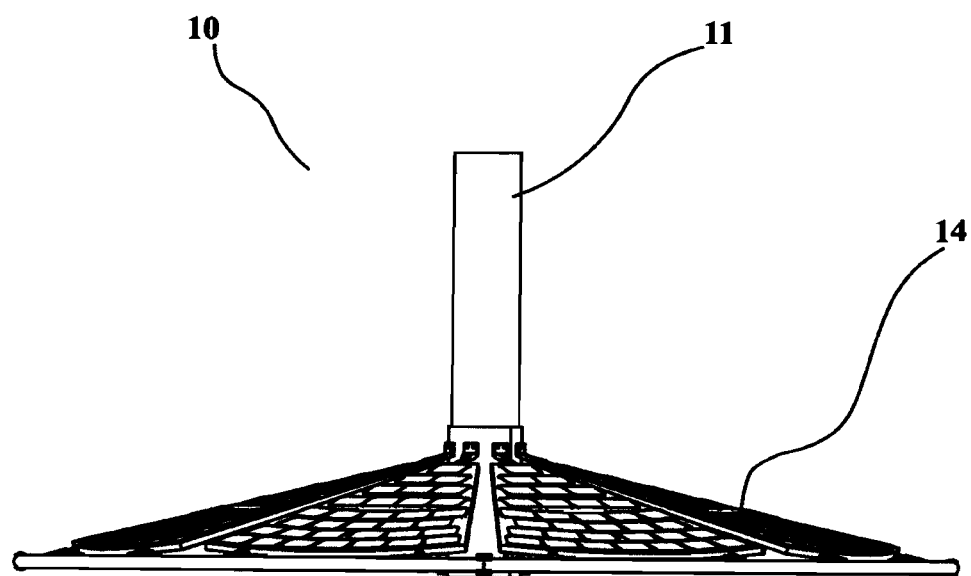
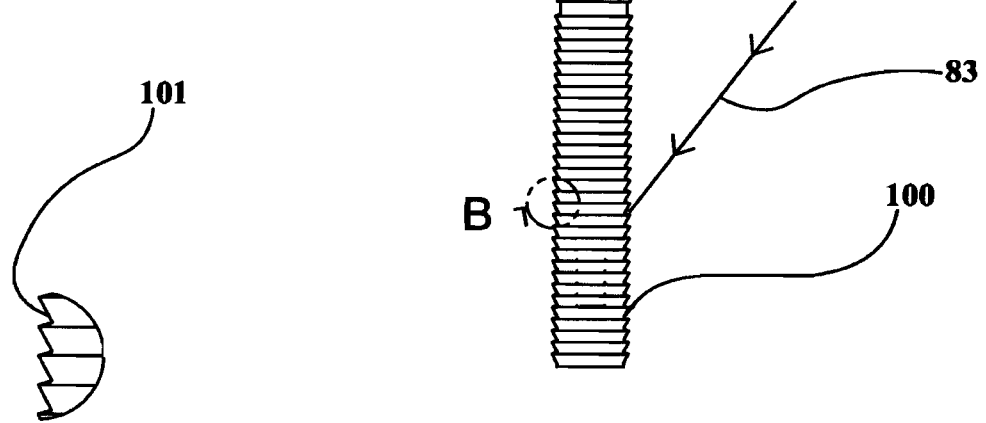
Fig. 10B

UTILITY POLE SOLAR ENERGY COLLECTOR SYSTEM

PRIORITY CLAIM

In accordance with 37 C.F.R. 1.76, a claim of priority is included in an Application Data Sheet filed concurrently herewith. Accordingly, under 35 U.S.C. §§ 119(e), 120, 121, and/or 265(c), the present invention claims priority to U.S. Provisional Patent Application No. 62/838,558, entitled "UNIVERSAL MOUNT SOLAR ENERGY COLLAR", filed Apr. 25, 2019. The contents of the above referenced application are incorporated herein by reference in their entirety.

FIELD OF THE INVENTION

The application of this invention will result in substantial improvement in solar energy harvest capabilities and utilization on new and existing utility poles and vertical structures of multiple types.

BACKGROUND OF THE INVENTION

The majority of vertical structures, telephone poles, are for the purpose of holding equipment at an elevated height above people, plants and vehicles. Poles that hold radio antennas are much the same. Currently, the majority of these poles carry electric or data wires or have electric power wires brought to them. There are a substantial number of these poles and very few of them produce any energy to be consumed at the pole or to feed the grid. The invention disclosed herein can be applied to different industries on new or existing vertical structures infrastructure to make use of the vertical space previously unavailable or unsuitable for solar energy harvest with traditional, existing solar panels and mounting designs.

Any application or industry that could benefit from deregulated, clean, globally available, solar energy can benefit from this invention. One example of the applicability of the disclosed invention is for the wireless industry, where the disclosed solar energy systems are ideal for the network's infrastructure. Wireless network systems connect cellular phones and other smart devices worldwide with radio communications for the purpose of making calls or transferring data. Historically these radio networks require both a hardline data connection as well as a hardline power connection in order to function. Current antennas focusing on 4G capacity and earlier technology used antennas mounted on large towers approximately 100-300 feet high and are required approximately every 1 to 10 miles depending on terrain, frequency bands, and traffic load density. Given the relatively low number of antennas and their robust installation it was not difficult to create dedicated power and backup systems for these units. Such systems could include high capacity batteries and large industrial generators on site.

As the latest technology, known as 5G, is implemented, a new array of comparatively small 5G antennas will require a close-proximity grid system in order to maintain a functional and stable network. With the advent of 5G it is necessary to have a much higher degree of autonomous sustainability in the event of a power loss, high power draw, natural disaster or other unexpected challenge. This is due in large part to the comparatively high density of 5G antennas that will be placed approximately 20-40 feet in the air and approximately every $1/16$-$1/4$ miles depending on terrain, load and frequency band. Because of the close proximity to housing, store fronts, public areas, people and animals the classic forms of backup power are not reasonable to support this new high-density grid style network.

Generators and fuel tanks that traditional, earlier-generation cell sites typically have will not be practical with 5G networks, yet the need for backup power is just as important with 5G networks. Therefore adding new solar energy harvesting and storage systems to new and existing vertical structures where the new 5G antennas will be mounted not only makes valuable energy harvest space of previously unused vertical areas, it also makes energy harvest more productive due to the added cooling properties of elevating solar panels. Solar photovoltaic has advantages and disadvantages that can be enhanced to generate more power at a specific location and design. Combining solar and wind and adding storage gives even more advantage to utility pole power production and utilization. However, wireless networks is just one example of a well suited industry that could benefit from this unique, high performing invention.

U.S. Pat. Nos. 9,196,770, 10,020,657 to Newdoll et al. disclose solar power systems and structures which are mountable to a power distribution structure, e.g., a power pole or tower, which supports alternating current (AC) power transmission lines. An exemplary power generation structure is fixedly attached to and extends from the power distribution structure, and comprises a mounting rack. A solar array, comprising at least one solar panel, is affixed to the mounting rack. A DC to AC invertor is connected between the DC outputs of the solar array and the AC power transmission lines. The length of the solar array is generally in alignment with the power distribution structure, and the width of the solar array is greater than half the circumference of the power distribution structure. The mounting rack and solar array may preferably be rotatable, such as based on any of location, time of day, or available light.

U.S. Patent Application Publication No. 2010/0237305 to Miller discloses a method of improving the functionality of pole mounted electrical producing or consuming panels. Current pole/mast mounted photovoltaic systems rely on gravity to lower the panel down the mast. The energy derived is typically conducted along a coiled conductor that expands or collapses like a spring inside the hollow mast as the movable device, with the solar panel attached, is raised or lowered for maintenance. Due to large size and stiffness of the coiled conductor, especially in cold weather, the eight of the movable device may not be sufficient to cause the panel to descend when tension on the supporting cable is released. The application discloses a method of pulling the sleeve/ring down the mast/pole as well as up. Over long periods of non-use, the sleeve can freeze in position. This new system aids in freeing it up and is also useful when there is un-even side loading on the sleeve. A winch driven chain or cable, attached to the moveable device, extending upward to a top roller then internally downward to the winch and then externally extending back up to the movable device, accomplishes this task. A further improvement is a plurality of vertical guide wires and guides attached to the conductor coils that prevent the coils from overlapping in the collapsing mode. An additional improvement is taught wherein the coiled conductor is replaced by a set of conducting rails with a shorter conductor attached to the solar panel.

U.S. Patent Application Publication No. 2010/0328932 to Fogerlie discloses a solar light assembly using a unique housing having a light that can be adjustably rotated and tilted for park and street light applications. Once assembled, the housing s covered by a solar panel that charges a remotely located battery and acts as a protective lid over the housing. Rather than removing the solar panel to access the contents of the housing, the housing can be accessed by excessively tilting the light until a shroud swings away from an opening in the housing designed to accommodate the light. The shroud, which can retract into the housing, protects the contents of the housing from inclement weather and from view. When the light is excessively tilted, the shroud swings away from the housing to expose wires, electronics and other contents of the housing that may require servicing. Because a solar light system is pole mounted at least several meters above ground level, being able to easily access the housing from below without needing to remove any heavy or awkward parts provides a much safer alternative than other solar light systems.

U.S. Patent Application Publication No. 2011/0005583 to Thomas discloses a partially non-rigid solar capture mounting system which reduces the risk of damage due to wind. The solar capture mounting system includes at least one pole, a horizontal beam mounted to the pole, and at least one backing plate hanging from the horizontal beam via a pivotal connection. Examples of pivotal connections are bushings with ball bearings, hinges, steel rings and spring clips. Wind pressure against a backing plate pivots the backing plate and the horizontal beam such that the system experiences reduced stress and reduced risk of damage due to wind and wind carried objects.

U.S. Patent Application Publication No. 2011/0017256 to Stevens discloses a solar power generation system that may include a thin film solar cell array, a micro-inverter connected to the thin film solar array, an electric plug interchangeably pluggable into the micro-inverter, and a gateway communications unit connected to the micro-inverter.

U.S. Patent Application Publication No. 2011/0041834 to Liao discloses a simplified and lower cost two-axes tracker for solar PV (photovoltaic) or CPV (concentrated photovoltaic) solar panels, as well as heliostat solar reflectors and solar Stirling engine. In particular, the disclosure addresses a simplified and gravity centered tracker structure with low cost single or dual linear actuators mounted on the side of the ground post which is easier for replacement and maintenance at a lower cost.

U.S. Patent Application Publication No. 2011/0073161 to Scanlon discloses a high efficiency, environmentally friendly system comprising a plurality of photovoltaic solar collecting panels (PV panels). The system comprises an outer frame to which a plurality of PV panels are attached. To minimize shadowing by the outer frame upon one or more PV panels, at least one PV panel may extend beyond an endpoint of the main frame. The system also comprises an outer frame rotation actuator that rotates the outer frame and an inner frame rotation actuator that rotates the inner frames and the plurality of PV panels. The disclosed solar tracking array frames help to improve the quality of the environment by conserving a variety of energy resources (e.g., fossil fuels, hydroelectric energy, etc.). The disclosed solar tracking array frames also help to reduce greenhouse gas emissions, as solar tracking array frames do not produce carbon dioxide byproducts.

U.S. Patent Application Publication No. 2011/0085322 to Myer discloses a solar-powered lighting system that includes a flexible, wrap-around, preferably self-stick panel of photovoltaic laminate applied to the outside surface of a light pole. An LED light fixture is connected preferably at or near the top of the pole. The LED light fixture has multiple columns and rows of LEDs and an interior axial space for air flow to cool the LEDs. The pole preferably also has vents and axial passage(s) for creating a natural updraft through at least a portion of the pole and the light fixture, for cooling of the photovoltaic panel interior surface, the LEDs, and/or other equipment inside the fixture or pole, and batteries that may be provided inside the pole or pole base. A purely or mainly decorative additional fixture, which emulates conventional outdoor light fixtures, may be provided on the lighting system, wherein the decorative additional fixture includes no, or only a minimal, light source. The lighting system has a sleep profile with few or no protrusions from the sides of the pole and from the LED light fixture, except for the optional decorative fixture that provides a conventional street light appearance even through the main light source is the LED fixture.

U.S. Patent Application Publication No. 2011/0120523 to Silver discloses the making the installation of solar energy systems easier through the use of augur tubes. The base augur tube accommodates telescoping sections which enable these systems to exhibit a smaller footprint with enhanced power ratings. A tracking head is provided in which dual axis tracking is provided using a single drive mechanism. These features are employed either together or independently.

U.S. Patent Application Publication No. 2011/016322 to Moser discloses a tracking device for automatically following a moving light source that is detectable in the presence of ambient light. A carrier platform including one or more radiant energy conversion devices and a sensor array is mounted to an upright support column with a universal joint. Three linear actuators, each having an associated light sensor, are equally angularly spaced about the support column with an upper end connected to the carrier platform with a universal hinge and a lower end connected to a floating base with a spherical hinge. The floating base is free to move axially but not radially of the support column. The actuator of a light sensor receiving a lesser amount of radiant energy retracts, and extends when receiving a greater amount of radiant energy. Each light sensor is moved in a stepwise manner, with a predetermined, limited number of steps used to define light source acquisition for tracking purposes.

U.S. Patent Application Publication No. 2011/0192460 to Tan discloses renewable energy sources which provide electricity without consuming fossil fuels and contributing to emissions that impact the global environment. Unlike wind and water methods solar photovoltaic generators provide this renewable energy without geographic or meteorological limitations. However, today electricity generation from solar using photovoltaics is more expensive than fossil fuel sources and is generally limited to deployments with large planar photovoltaic panels. According to embodiments of the invention, concentrator based azimuth-altitude tracking solar power generators are provided offering reduced electricity generation costs, reduced installation costs, increased flexibility in deployment and locations of deployment, and initial system costs. The optical assembly comprises a concentrating lens and a reflector to couple the solar radiation to the photovoltaic cell. The concentrating lens is offset out of the plane parallel to the photovoltaic cell whilst the reflector and the reflector may be disposed angularly offset to an axis perpendicular to the photovoltaic cell.

SUMMARY OF THE INVENTION

The photovoltaic (PV) solar energy harvesting system disclosed herein has a unique ability to mitigate inevitable power loss issues that occurs on radio antenna grid networks. Unlike the classical power backup solutions for traditional radio towers, solar PV panels can collect energy from the sun during the daylight hours and store that energy in a battery(s) for use during the night, peak power demand or other times in which power is unavailable, unreliable, or too costly.

The embodiments of the present invention include a unique design of the panel(s) and the way in which they are arranged, the way they move to mitigate winds, and the way they attach to new or existing structures. The disclosed embodiments disclose solar panels that are pie shaped and arranged as flower petals around a center clamp which can be mounted on vertical pole-like structures that may benefit from a solar power source.

A solar panel is an assembly of solar photovoltaic (PV) cells connected electrically together to have specific characteristics of voltage and power. In one embodiment disclosed herein, the panels mount in a unique, more effective way in terms of energy harvest potential, more aesthetically pleasing and more resistant to wind load. The panels in this embodiment perform better during different seasons and times of day. These unique solar panels function as passive solar trackers, and increase energy harvest potential over the entire day, superior to the traditionally mounted rectangular solar panels.

Using a trapezoidal or pie shaped design in conjunction with the unique mounting assembly disclosed herein creates the unique solar ring embodiment described more fully herein. The solar ring embodiment can be mounted on a variety of vertical structures and work in all seasons and at all times of day. Using this design, no pitch, azimuth, or bearing adjustments are required, though the design can be optimized for the latitude of installation site. Rather than using pitch/azimuth/bearing adjustments, as practiced by the prior art, the solar ring embodiment disclosed herein can track the sun by the very nature of its design.

The panels are also capable of energy harvest from reflected light on their bottom surface employing bifacial photovoltaic (PV) cells. Bifacial solar panels that use bifacial cells allow light to be absorbed on the top and bottom surfaces, thereby nearly doubling the potential energy production. In certain applications, bifacial cells increase energy harvest potential by about 20-30%. With the unique reflectivity properties of the disclosed optional reflectors, the bifacial energy harvest increase potential by up to 70%. The present solar ring designs allow for much higher energy harvest with bi-facial solar panels when combined with optional reflectors. Further, the use of a pole mounted tracking system can increase the efficiency by maneuvering traditional solar panels around the axis of a vertical pole thereby making very efficient use of traditional mass produced, flat, rectangular shaped solar panels with the use of this tracking system.

The disclosed solar panel embodiment utilizing pie-slice shaped panels with various pole mounting collar assemblies allows for sturdy mounting in any portion of a circle up to 360 degrees. By spiraling the panels down as they wrap around more than 360 degrees can be achieved and be productive. The solar panels can be manufactured in application specific sizes, using flexible, thin film or other non-rigid photovoltaic (PV) semiconductor materials allowing the panels to be wrapped around the surface of a pole or support structure, thereby increasing exposed surface area capable of solar energy harvest.

Partial or full rings can be used to make use of previously unavailable solar energy harvest space on vertical structures. For example, one or more 360 degree solar rings can be mounted on a cell tower pole, light pole, parking lot light post, or any other vertical support pole. However, one-quarter, one-half or three-quarter solar ring assemblies could also be used for water tower legs or other vertical supports that don't allow for unshaded energy harvest area on all sides of the pole. This unique mounting and solar panel configuration flexibility adds to the uniqueness of this invention and the large number of potential mounting structures available.

This harvest of free energy in otherwise unused, high solar energy harvest potential space on new and existing infrastructure can generate significant quantities of clean energy worldwide with no additional ground space required. This unique design allows mounting above potential shading obstructions such as tree limbs. Mounting this unique energy harvest device vertically also allows for more cooling of the solar devices which makes them more productive. A wider view from horizon to horizon is achievable with these unique vertical photovoltaic systems allowing for more hours of light to be used for energy harvesting. The higher these systems are mounted, the more hours of daylight they will receive making them more efficient than ground level photovoltaic systems. The unique design, its low weight, and center of gravity located in the center of the tower allow them to be used without overloading the poles with weight or added wind load stress.

Solar assisted cell poles can also use solar as a single power source in developing parts of the world or rural parts of a country. This will make life saving critical communications available anywhere in the world without the need for utility grid connections. The unique solar energy harvest systems disclosed herein can also greatly offset power consumption of existing infrastructure. For example, worldwide deployment of wireless networks consume vast amounts of electrical power. These solar energy harvest systems can be used to greatly reduce the amount of grid power consumed by traditional networks. As these networks systems grow with the addition of 5G wireless, so will their demand for power grow. These solar devices can be used for power offset, backup—emergency power, off grid applications or a combination of all of them worldwide. These unique designs can combine viable solar energy on new and existing cell site poles, towers, etc. with energy harvesting capabilities unmatched in their abilities.

In one embodiment the assembly's panels are pie shaped and are assembled with air gaps between them to allow wind to pass through. This design allows for improved convective cooling of the individual panels, which results in an optimized energy harvesting potential that cannot be claimed by current solutions. Additionally, these panels are highly adaptable to changing conditions in that they are affixed with springs which allow movement of the panels under wind load. This greatly reduces the load bearing that would be experienced by traditionally mounted solar panels. The solar ring assemblies not only outperform conventional panels in energy harvest, but they are by design, far superior in their high wind mitigation characteristics. This is a crucial benefit to this design that is important in many areas of the world prone to high wind conditions.

Under very high wind conditions such as hurricanes or tornadoes, this solar ring assembly can survive where traditional panels and racking cannot. The likelihood of damage or failure under extreme conditions is greatly reduced with this design when combined with optional pitch and stowing controls.

Further, the solar panels can be designed such that they catch the air current and can act as airfoils. The panels could be attached in such a way that they can be controlled by a combination of sensors, electronics, and motors, pulleys, or other mechanical means to rotate about x and y axis. The collar of the invention would then act as a windmill hub and the other components of the windmill would be embedded within the vertical support structure.

An objective of the invention is to create a unique solar ring energy harvester, using trapezoidal or pie-shaped bifacial solar panels including a plurality of panels (frequently 8) mounted in a ring (frequently octagonally) surrounding a utility pole. A variety of sizes and shapes can be manufactured for various vertical structures.

Another objective is to mount this unique solar panel design to provide a ring of panels surrounding a center pole assembled like flower petals.

A further objective is to use floating, non-contiguous, bifacial solar panel petals work together to create an entire system of energy harvest potential, mounting flexibility, wind and weight loading.

Another objective of the invention is to provide solar panels with specific strength and mounting characteristics that allow them to be mounted in a ring shape assembly around a variety of central vertical poles.

Another objective of the invention is to use mounting hardware design that allows the solar energy harvest device to be installed on a variety of industries' vertical structures, including light poles, power poles, parking structures and other minimal load bearing structures, water towers, existing radio towers (guyed, monopole, stealth, self-supporting towers), which can all be used to create vast amounts of unshaded vertical space for solar energy harvesting.

A still further objective of the invention is to provide a system to mount the disclosed solar ring to existing buildings.

Another objective of the invention is to support any new or existing wireless communications network in an environment that does not have easily accessible, cost effective or reliable grid connected utility power, and thereby creating a cellular network infrastructure without a connection to a utility grid.

Still another objective of the invention is to use a solar panel and assembly design, and mounting hardware that allows for optimal responsiveness to high wind velocity and significant changes in wind direction.

Still another objective of the invention is to provide a collapsible, retractable design to tuck the solar panels tightly to the support pole structure, lower the surface area and reduce wind resistance.

Still another objective of the invention is to provide the assembly such that it can also generate wind energy.

Still another objective of the invention is the design of the panels with bifacial cells which allow for the ability to capture light from the primary sunbeam on the top surface and reflected sun beams on the bottom surface, such as those below the ring assembly.

Another objective of the invention is to demonstrate the use of sun tracking and active solar panel orientation as an optional way of maximizing the efficiency of the installation.

Yet still another objective of the invention is to provide shade below the arrays that can benefit society in numerous ways. Not only can limitless amounts of energy be harvested on new and existing vertical structures, they can also provide usable shaded areas. Outdoor bus stops, deck tables, traffic lights, and parking lots, etc. shaded by solar energy harvesting devices of the present invention can benefit society in multiple ways. For example, ground temperatures at water towers or cell towers can be reduced, providing much needed cooling effects to ground level staff and equipment. The solar ring design can provide a large amount of shade especially when using various diameter rings and multiple rings on a single pole at varying heights. This design can provide far more ground level shade from a single pole structure than any existing solar panel design in a 360 pattern while simultaneously generating vast quantities of free, clean energy. Only the solar ring design is capable of mass deployment in many types of vertical spaces that will allow through sheer numbers the added benefits to society in terms of energy harvesting, lighting and ground shading.

Yet another objective of the invention is to deploy vast amounts of clean, renewable, distributive energy on new and existing pole structures. With the lower wind loading capabilities and higher energy harvest potential of the solar ring design, poles and vertical supports can be used to make distributed energy production with no need for large tracts of land to be used for large, utility scale solar farms. This can have a dramatic increase in solar energy harvest worldwide. No loss of land would be required as is typically needed in large, utility scale solar farm deployment. For example, enough solar rings could be deployed in a localized area on existing pole structures that, when combined, could equal or easily surpass the amount of solar energy harvested at traditional solar farms. However, in this case with the solar rings, the same net effect of renewable energy production can be attained in the same vicinity with no need for additional ground space taken up by large solar farms. Distributed energy harvest can be done where previously it could not have been with the use of this design. For example, hundreds or thousands of acres of traditional solar farm space would not be required if enough solar rings were deployed on existing infrastructure, therefore eliminating one objection to land use for large scale solar farms. No land use, no land development, no loss of agricultural land, but energy harvest potential remains.

Yet still another objective of the invention is to make grid power more reliable and sustainable with distributed production across existing infrastructure. For example, distributed energy harvest with solar rings mounted and connected to the overhead utility grid lowers transmission costs, distribution losses and balances and stabilizes grid voltages and power factors. The power plant could be replaced or augmented with solar rings deployed through grid infrastructure to provide reliability and stability not available in the traditional, linear, power plant grid infrastructure that currently serves homes and businesses. The traditional electric utility grid as we know it today could dramatically change for the better with widespread usage of this design.

Solar rings deployed in numbers throughout the utility grid worldwide, combined with modern battery technologies could eventually replace legacy power plants of all types. This capability is only achievable with a solar ring's design capable of vast energy harvesting without wind, weight, structural and aesthetic concerns. These solar energy harvest systems that can make utility systems worldwide more efficient, more robust and more reliable. If deployed at a sufficient scale with optional, onboard modern battery technologies, these solar energy systems, which are capable of storing significant amounts of battery power, could back feed the Smart Grid in times of emergency, black outs, disaster, high demand situations, etc.

With enough solar energy harvest and battery storage, lifesaving power can be much more available from a free and clean source that is readily available worldwide. Backup power provided by these systems can help back-feed power to utility grids on an enormous scale making their potential as an energy storage and distribution network limitless. In the case of a post-hurricane scenario, these systems could be used to keep lifesaving power available by eliminating the linear design restraints of the traditional power grid infrastructure.

With distributed solar energy production over wide areas of electric utility grids combined with microinverter technologies, utility grid circuitry and supporting structures can be made into a huge distributed energy generation infrastructure. This will lower electrical losses due to closer proximity of generation to distributed loads, increase grid efficiency, aid in smart grid improvements, balance voltage, and power quality and help facilitate resiliency as utility scale battery storage systems are deployed. This design, when deployed with new or existing inverter technology, can reduce or eliminate the need for fossil fueled, hydroelectric or nuclear power plants which will greatly lower pollution and greenhouse gas emissions. Only the solar ring design is capable of such mass deployment on such a large number of vertical spaces that will allow through sheer numbers the added benefits to society in terms of energy harvesting, lighting, ground shading, grid efficiency, grid resiliency, sustainability and environmental improvement.

Yet still another objective of the invention is to provide much needed lighting for roadways and areas in need of safety or security lighting without the need for utility grid connections, conduit, wiring or associated costs. With these vertical structure solar energy harvest devices, limitless power and lighting opportunities can be created when combined with modern battery technologies. Entire interstate highway systems can be lit with light poles, charged by the sun and turned on at night with photocells without any connection to the grid. Wiring-cost savings alone could make this design a replacement for all existing outdoor lighting systems. Such solar ring poles could also be placed anywhere in a totally autonomous self-reliant solar network and can provide much needed lighting anywhere in the world with 100% free and clean energy. The solar ring design with low wind and weight loading combined with led lamps, photocell controls and modern battery systems allows for roadway, parking lot, street and security lighting anywhere under the sun.

Yet still another objective of the invention is to take advantage of the significantly higher power output from the present solar ring technology, providing personal power to citizens in various forms, including phone charging stations and power stations for electric vehicles. Due to the high energy harvesting potential, installation flexibility, personal use of the solar rings can provide much needed electrical freedom and security to people all over the world. No other design can produce as much power in such small and unique places above ground space limitations and shading obstructions.

Yet still another objective of the invention is to accommodate and integrate all forms of solar collection on the market now and in the future. Present technology includes monocrystalline solar cells, poly crystalline solar cells, thin film solar cells, perovskite and others. Rigid and flexible cells can be used in framed or frameless applications. The present design is not limited to any existing type of solar-panel/solar-cell technology, but can easily be adapted to utilize more efficient cells as solar technology advances, thus making the invention capable of evolving and providing sustained energy harvest value over the long term. As photovoltaic (PV) cells and materials evolve, the solar ring design can be upgraded to incorporate all of these advances in technology, further reducing the space, weight and cost associated with deployment while keeping the design capabilities of going up high in previously unusable solar energy harvest space.

Another objective is to harness solar energy on vertical type structures such as water tanks. Solar generated electricity can be generated on the legs of new and existing water towers with full 360 degree or partial circle solar rings depending on the water tower structure design. The free, clean, electrical power can be used to power the pumps that bring water to the top of the tower. Of course, gravity is used for pressure on the way down into municipal water systems. So, in effect, all public water systems could be self-powered, self-sustaining and 100% clean energy powered. They would also no longer be reliant on the primarily fossil fuel powered grid. This solar design can be used to keep water systems running in the event of a natural disaster such as a hurricane. Lifesaving power and water can be used with the deployment of these solar-ring mounting systems. No other solar panel or mounting system can be deployed up in the air on water tower structures in such a way and with such efficiency without too much wind, weight and structural stress. The solar ring design will overcome these design challenges while outperforming any current solar technology in those unique applications.

Another objective is to create solar cells that are individually sealed and have 4 connection points that are also electrical connections and have no other supporting structure, glass squares with 4 holes where each of the 4 holes is a positive or negative connection and supporting point. The required solar panel electrical connection cables can also serve as the panel connections to the ring frame eliminating the needs for springs or other cable type supports. They can be arranged in parallel or series to reach the desired voltage and can be arranged in patterns that adjust to the shape of the structure. This design allows the individual solar panels of the solar ring to be lighter, more flexible, different shapes, different sizes, curved and made of any existing or future photovoltaic materials thus increasing the number of potential mounting locations and applications. Frameless solar panels allow for nearly limitless possibilities and unmatched performance when combined with this ring design.

Another objective is to allow for artistic applications unrealizable with traditional solar panel and mounting supports. Various types of solar material exist today that are colored or essentially camouflaged. They can be used as stealth energy harvesting devices. For example, these solar rings can be made with green poly crystalline solar cells that make the collection surfaces look like foliage of surrounding trees. This will greatly increase aesthetic appeal making their deployment worldwide more easily accepted by the communities they serve. The very nature and design of these solar rings mimics what is seen in nature on many coniferous type trees. When combined with colored, or stealth type solar materials and coatings, they can blend into their surroundings becoming much less obtrusive than traditional solar systems while still performing their role of solar energy harvesting. Other existing or future colored solar cell materials can be used to create color patterns or aesthetically pleasing designs. For example, imagine solar rings with alternating team color panels on light poles at a sports stadium.

Another objective is to create mounting brackets for solar single-axis and dual-axis tracking systems that can attach to utility poles so standard solar panels can be used on poles with traditional tracking systems. Additional specific mount would be required for the radio antennas or other peripheral devices to be placed above or below the tracker. Top of pole mounted active trackers can follow the Sun's east to west path as well as tilt angle. The use of these systems can make use of readily available, flat, rectangular single-sided or bifacial modules. Top of pole active tracking still allows for above or below peripheral devices to keep the multi-purpose design benefits allowed with these patent ideas.

Another objective is to improve the productivity of the pole or structure mounted bifacial solar systems by reflecting sunlight off enhanced ground back up onto the underside of the solar absorber. Since the design of the umbrella style, flat fixed and flat tracking styles of the solar collectors are bifacial type solar cells and panels that can absorb light on both front and back surfaces. Bifacial means that the cells within the panel can absorb light from both top and bottom surfaces. Depending on the quantity of light reflected back up to the bottom surface of the solar panel the energy production can enhance by 70%. Every percent increase in production has a high value to any industry. Telecommunications, for example, would benefit greatly from this increased energy harvesting potential. This is a significant improvement in some applications. A pole mounted to a flat surface such as a parking lot or sidewalk has a native surface like asphalt or concrete. These surfaces have a native solar reflection that is usually low.

However, a high reflective mirror placed on the ground at a specific location for a specific time of day will reflect the primary beam of sunlight back up onto the bottom of the solar panel and increase the energy production. A mirror may be used in specific locations. Reflective paint applied to the native surface at a location of the bifacial panels allows increased reflection of the sun to the bottom surface of the panels and thus increases the solar production of a bifacial panel. Numerous reflective surfaces, optional reflectors and distinct designs can be combined to maximize reflectivity to the underside bifacial solar panel areas. These potential benefits are much more prevalent with the solar ring design.

Another objective is to optimize the shape of this painted patch on the ground for the most gain and least paint used. That shape is determined on the latitude of the installation, shape of collector and height of installation. Calculating based on these factors can determine the optimum reflective patterns based on the above properties and the sun's path each day of the year and time of day. The distance from the solar umbrella center mounting point to the center point of reflection. The ideal solar panel design for this type of light reflection is an umbrella type structure which is another unique advantage of the solar ring design when bifacial solar panels and reflectivity are used.

Another objective is to optimize the properties of the reflective paint in terms of frequency and quantity of light reflected. Solar radiation with wavelengths of 380 nm to 750 nm is the best for photovoltaic production and thus paint that reflects these wavelengths of 380 nm to 750 nm would be optimum. Other surface properties of paint and application methods (e.g., applying a clear coat over a reflective coat), as well as the density of any clear coat also affect the reflection and durability of the reflection and thus the solar production. The design options combined with the solar ring using bifacial solar panels can work together to increase energy harvesting capabilities. This maximum collection of available solar energy producing light can make the most use of all available light in a small area, which adds to the flexibility and overall performance of this design.

Another objective is to optimize efficiency using reflective tape, mirrors, woven matt, rock garden, specific sand/soil, tile, concrete treatment, canopy, selective vegetation planted garden, reflection pond, native holding pond, or other items laid or planted on the surface of the location of the structure mounted with the bifacial solar ring to increase reflection of the sun to the bottom surface and thus increase the solar production using a bifacial solar panel. The shape and properties of which is designed to enhance the production. Numerous options, reflectors, materials and mounting surfaces can be used alone or in combination to increase energy harvest potential. Poles can even be installed over water such as a holding pond or lake to make use of the reflective properties of water and to make use of energy harvesting space previously thought unusable. This ability will increase energy production and the number of usable areas worldwide that can become potential clean energy production areas.

Another objective is to provide a Fresnel style reflector to be applied to the ground surface below the bifacial solar absorber that optimizes the reflection to the bottom surface of the solar absorber. A Fresnel type, light focusing or reflective surface can be manufactured in such a way as to gather and focus light energy back up to the underside of the solar ring which will increase energy harvesting potential. A much wider area below the pole can be used to gather light than what is available on the upper ring area. With this design ability, maximum energy harvesting is possible.

Another objective is to provide a transparent surface (glass) over a series of mirrors that can be stationary, or where each mirror can be adjustable by motor and logic, such that the light hitting the ground is reflected from the ground surface to below the bifacial solar absorber that optimizes the reflection to the bottom surface of the solar absorber.

A still further objective is to provide remote primary reflectors that may be independently standing or attached to a near surface, like a building, that are intended to reflect sunlight back to the solar absorber. Variations of reflectors include reflective paint, tape, mirror(s) applied to a building, towers, post, pole near the solar umbrella, flat or tracking solar designed to enhance the reflection back to the power production utility pole. Passive or active reflectors can increase the overall energy harvesting capabilities possible with the solar ring design.

Another objective is to provide a plurality of primary reflectors mirrors attached remotely that are each independently adjustable, including as motor and control driven, designed to reflect back to the power production pole to increase solar energy production. Such a system could utilize active tracking or passive tracking. These reflectors can be designed to reflect back to the umbrella shaped system or other solar systems attached to the pole. Numerous primary actively controlled reflectors can be combined. As many reflectors as space will allow can be used together to reach the desired energy harvest.

A further objective is to produce a Fresnel style mirror to reflect off a structure back to the solar panel to increase production and not require active tracking. Nearby structures such as buildings can be used to support Fresnel type reflectors, mounted in close proximity to the solar ring which can allow normally unused light energy to be redirected towards the upper and lower side of the solar ring.

A still further objective is to provide a pole base, which is used to attach the pole to the ground, as a reflector. The base can be much larger than the pole and used to store radio, lighting controls, batteries or utility equipment. The base of a pole can be shaped to optimally reflect up to the bifacial solar panels. The pole base can be designed to reflect up the sun and thus increase the production. In one embodiment, the base is a wide cone or pyramid shape which can be optimal for low latitude installations. The pole reflective base can act as a primary passive tracker, while also serving as pole ballast as well as serving as weather protective storage for optional devices such as the ones listed above. For example, a parabolic reflector mounted below a bifacial solar ring will gather and focus additional light energy thus increasing the overall energy harvest of this unique design.

Another objective is to provide a pole base with an active tracking mirror, as a reflector. The motor driven and controlled mirror tracks sun path for optimum production. The mirror can have a variety of shapes that optimize the umbrella production. One preferred shape is a shallow parabolic or Fresnel mirror. The pole base can also include active tracking. These optional active trackers may be used to further increase energy harvest potential reflective surfaces and materials of all types can be used for these systems adding to the overall capabilities and uniqueness of this patent.

A further objective is to use the utility pole as a reflector to increase energy production. A tall, wide, and frequently tapered pole has a lot of surface area below the position of a solar ring collector. Carving into the outer pole surface, even only a millimeter deep and creating a sawtooth shaped or thread pattern of rings around the pole, creates a series of mirrored surfaces like a Fresnel mirror surface or Fresnel lens. These series of reflective surfaces below the solar collectors reflect the sun to the bottom surface of a bifacial panel thus enhancing the solar production. Millimeter deep structures can be carved directly into a slightly thicker pole without compromising its strength or resistance to wind load.

A sawtooth shape is presently understood as creating an optimal vertical reflection from the pole to a solar ring. Each sawtooth ring, each at a different height, would have a different tilt angle for increased reflectivity. Furthermore, the tilt angle can be designed to vary for increased reflectivity based on a variety of factors, including the time of the year a maximum output is desired. In most circumstances for radio poles, consistent and or minimal production of sawtooth rings is more important than the total annual production, thus the angle of the reflector surface would usually be designed for a lower sun angle. The addition of Fresnel poles allows for an increase in energy harvest capabilities unique to the present solar ring design.

Another objective is to use the portion of the utility pole above the solar ring to reflect additional light down to the solar ring to increase production. One way this could be accomplished is by providing an inverted cone at the top of the pole. Another variation would provide a Fresnel type reflector carved into the surface of the pole and/or a cone. This type of reflector could be formed in the surface of, or attached to, the antenna that is traditionally located at the top of such a pole. Cones and reflectors above and below the solar ring can be used in tandem to further improve energy harvesting capabilities of this design.

Another objective is to provide a Fresnel-type reflector wrap for a standard utility pole for increased energy production. Such a wrap would have a similar function of reflecting light energy to the solar ring from the pole surface solar irradiance. This wrapping can be added to new or existing poles to increase the energy harvest effect of a solar ring without having to replace or modify existing poles with forged, or machined Fresnel reflectors. This wrapping can be applied with more common mechanical attachments, such as adhesives or other types of fasteners.

Another objective is to provide an inverse parabolic reflector or inverse Fresnel reflector below the collector that would act as a concentrating reflector to enhance the energy collection of the solar ring. The addition of these optional reflectors used in conjunction with the solar ring bifacial solar panels can increase its ability to harvest solar energy. Two opposing umbrella type assemblies working together with one as a reflector, focusing unit and the other a photovoltaic energy harvest collector can produce higher levels of energy within the least amount of space which is unique to this design.

A still further objective is to provide a secondary mirror on the pole, operating in conjunction with a primary mirror located on a nearby structure, so that the two mirrors reflect the maximum amount of surface and near-surface level light back to the underside of the solar ring.

A further objective is to provide different shape poles on which a solar ring can be mounted so as to increase the energy harvesting ability of the solar ring. For example, shaping the pole conically with a wider diameter at the base, narrowing towards the top, would aid in reflecting light upward towards the underside of a solar ring. Similarly, external shapes with mirrored surfaces could also be used to enhance solar collection. Such designs could also be used in combination with a primary mirror positioned on a nearby object to reflect light back towards the pole.

An additional objective is to provide a mobile energy collection unit, including a solar ring mounted on a pole where the pole does not need to be fixed underground. While most utility poles are partially buried, bolted to concrete slabs, and/or held in place with weights, the present application discloses a system where the concrete slab could be replaced with a system including a racking system which integrates with the pole base to support the pole and solar ring system for solar energy harvesting. Such systems could be employed in places which require a small tower, light pole, or other multi-purpose pole, but where such a pole cannot be inserted below the ground surface, or cannot be inserted deep enough to support the pole. In such cases ballast mounted tower or pole bases can be used in conjunction with a solar ring to provide an energy collection device.

BRIEF DESCRIPTION OF THE DRAWINGS

FIG. 10A is a side view of the top portion of a solar ring assembly with a Fresnel tower on the pole;

FIG. 10B is a partial view of the Fresnel tower of FIG. 10 taken along line A-A;

DETAILED DESCRIPTION OF THE PREFERRED EMBODIMENT

Referring now to FIGS. 1-13, the present invention relates to a photovoltaic (PV) solar system for integration with vertical structures. Examples of vertical structures disclosed in greater detail herein include utility poles or other poles used for telecommunication, lighting, electric transmission or any other industry or application.

A detailed embodiment of the invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
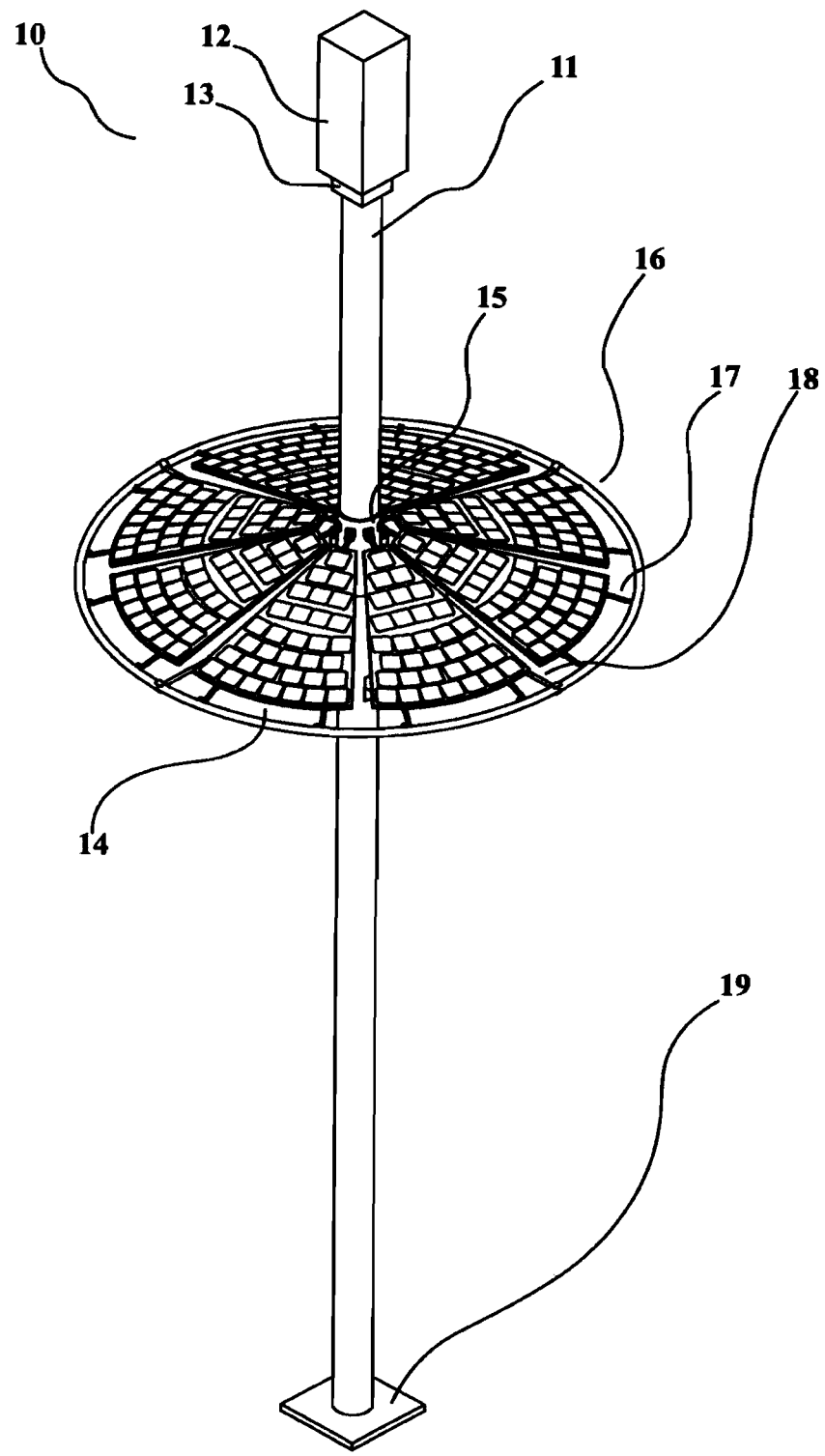
FIG. 1 is a top perspective view of a solar ring assembly.

FIG. 1 is a perspective view of the solar ring assembly 10 preferred embodiment mounted on a vertical support structure 11, commonly a telephone pole, utility pole, cellular antenna pole, light pole or similar. A radio antenna 12, street light, traffic light, sign, or other optional/peripheral device is seen mounted atop the vertical support structure 11 using a tower mounting adapter 13. A plurality of trapezoidal shaped bifacial solar panels 14 are attached to a vertical support structure 11, via a collar 15. Collar 15 is shown in greater detail in FIG. 4.

The bifacial solar panels 14 are held outstretched by an outer ring support 16 via solar panel spring attachments 17. In a preferred embodiment a metallic spring is used to dampen the stress on the glass panel during high winds. Alternative methods to reduce tension in high winds include using torsional wires, elastic membranes, spring, clamp, cable or chord type flexible and (or) non-flexible attachment device for connecting outer and inner ring support to solar panel frames. Airspace in between each solar panel is intentionally designed into this assembly allowing wind loading and wind uplift to be greatly diminished. This air space allows wind to flow in between panels, which allows far greater structural performance of the entire assembly in high wind conditions.

A ring support rod 18 extends from the vertical support structure 11 via an inner rod mount 23 (shown more clearly in FIGS. 2 and 4), up and outward to the outer ring support 16 to elevate and secure the outer ring support 16. The inner vertical support attachment 42 connects solar ring assembly solar panels 14 to the vertical support structure 11 which can be a structure such as a utility pole, tower leg, post, streetlight or any existing or future vertical support structure. The vertical support structure 11 can be manufactured with similar, conductive or non-conductive materials as mentioned in 16. The vertical support structure 11 or pole can be tapered or non-tapered. Generally, such poles are hollow on the interior to allow for cabling, etc. but they can be made of any solid, rigid material. The vertical support structure 11 can also be sectional or contiguous. Welded or mechanically attached points corresponding to the spring attachments 17 can be fabricated into the outer support ring 16 to provide vertical and lateral support of the photovoltaic solar ring solar panels 14.

The vertical support structure 11 is secured to the ground via vertical support base 19, which can be welded to the vertical support structure 11, so as to be manufactured as one contiguous piece, or mechanically fastened to the vertical support structure 11 through common mechanical attachment, such as by bolting, or other method of ground level support. Cason attachments, welding, helical piers and non-ground penetrating ballast pole bases can also be used.

A plurality of solar panels 14 combine to form the ring assembly 10. In preferred embodiments, the panels 14 can be trapezoidal shaped or pie slice shaped, though other shapes, can be used if desired, such as rectangular panels. The solar panels 14 include glass faced, or transparent membrane, photovoltaic (PV) panels enclosed on both sides. Solar panels 14 may be convex or concave or sloped depending on aesthetic or energy harvest requirements. The purpose of the panels 14 of the solar ring 10 is solar energy harvesting, and the solar ring assembly 10 allows such energy to be collected from a unit mounted on utility poles, proving energy harvesting while improving aesthetics and wind loading characteristics. An alternate assembly can use two panels mounted in one support assembly where each panel comprises 25% of a circle or 90 degrees. Other configurations of 90, 180, 270 or 360 degrees can be achieved by using 1-4 sections of solar ring assembly to make up to a full circle or 360 degrees. Any individual panel can be omitted from the configuration for any reason (avoidance of an obstruction, aesthetic reasons, etc.).

Photovoltaic (PV) cells laid out in a manner that fills available space, wired in series and parallel to achieve desired, provides maximum energy harvest with a plurality of solar semiconductor materials. Transparent glazing material can be used to affix the solar panel internal components. Framing may be machined and attached to the solar panel 14 or the panel 14 can be frameless. The panels 14 can include wires on the top or the bottom of the panels, which are typically DC connections.

A complete solar ring assembly 10 with multiple solar panels can complete a 360 degree full circle, or can spiral up or down for more than 360 degrees. The presently embodiment of the solar ring assembly is roughly 10 feet in diameter. But larger and smaller diameter rings can be produced and mounted in the same fashion. Multiple rings of the same size or varying sizes can be mounted on a vertical support structure to increase energy harvest. In such cases, the structure itself would need to be engineered to support the additional weight and the change in weight distribution along the length of the structure. This is especially useful for taller monopole structures. The need may arise to reposition the entire solar ring assembly 10 for the purposes of removal, cleaning, optimizing energy harvest, or to accommodate other devices being mounted or removed. In such a scenario, the solar ring 10 can be fitted with mechanisms that achieve this including but not limited to pulleys, cable spools, wheels, gears or tread devices. These would be mounted on the vertical support structure 11.

The present solar ring assembly 10 provides superior energy harvesting potential and vastly greater options for positioning such devices, as compared to traditional solar panel systems. For example, to make 100 kilowatt hours (kwh) of solar energy would require far fewer solar ring assemblies than it would require using traditional, flat, non bi-facial panels. This results in a lower overall weight of materials used to energy production using the solar ring design, substantially lowering associated deployment and manufacturing costs. Less solar panel material to reach the same solar energy production goal translates into less weight, less wind loading, less cost and less assemblies required.

Additionally, the solar ring assembly 10, being capable of mounting very high up above ground of rooftop level, increases the energy harvest potential as well due to airflow and convective cooling properties of the atmosphere regardless of location on the globe. For example, a solar panel of any type mounted at or near ground level in Florida will be considerably hotter than the same panel mounted above ground level. A pole or vertical support mounted solar panel 20 feet, 200 feet or 2000 feet up in the air will gain the benefit of additional airflow and lower air temperatures from being above turbulence and wind blocking objects, such as trees and buildings. The gains in efficiency and production go up substantially with gains in mounting altitude. More air flow equates to cooler solar panel temperatures, which equates to less electrical resistance in the solar panel. The result is higher energy harvest for panels mounted higher in elevation anywhere in the world. There is also less atmospheric diffusion of light from such things as dust, moisture, pollution at higher altitudes. Lower operating temperatures also increase solar panel lifespan. Additionally, a higher mounting height such as a pole, or tower—in many cases—allows for greater time of exposure to sunlight by the solar panels. A pole mounted panel far up above trees and other obstructions will have an earlier dawn and a later dusk. In short, the hours of available light for solar energy harvesting are increased making more energy production possible. The same principles can be described with orbiting solar panels. The light energy is much stronger above the atmosphere, there is zero shading and it is very cold in space making photovoltaic solar panels much more productive than they would be on the surface of the earth.

Figure 2:
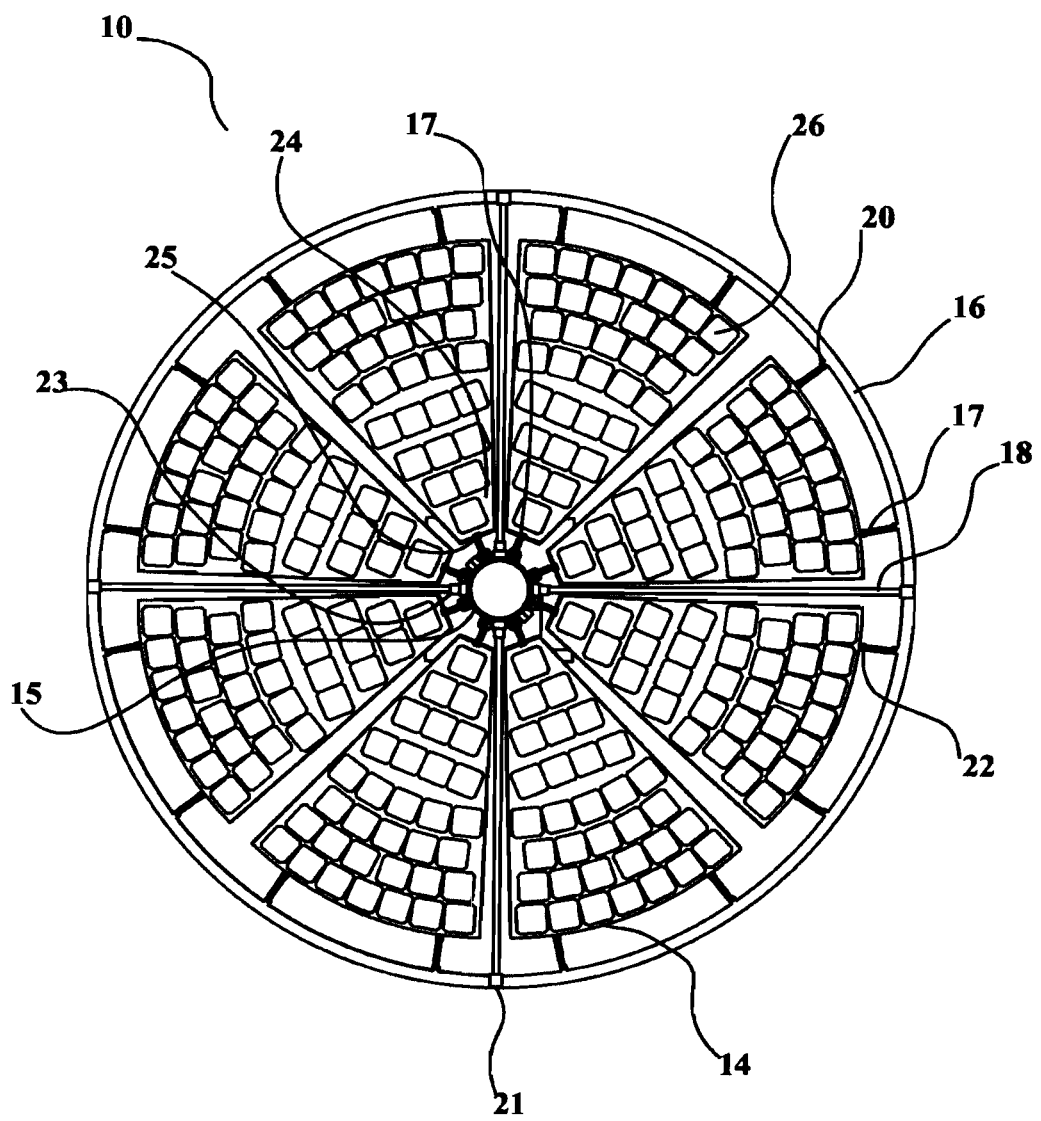
FIG. 2 is a top view of the solar ring assembly of FIG. 1.

FIG. 2 is a top view of the solar ring assembly 10. In this embodiment the solar ring assembly 10 is symmetrical around the center of the vertical support structure 11 and therefore has a center of gravity within the vertical support structure 11. The outer panel spring attachment 17 can be seen attaching to the outer ring support 16 at the outer ring spring attachment point 20. In the preferred embodiment this point is a bolt that penetrates the outer ring support 16 and the ring male segments 21 simultaneously. The solar ring assembly 10 can be drilled or manufactured to allow for springs, bolts, clamps or other rigid, or non-rigid attachment types to the outer or inner mounting points The outer ring support 16 can be made of four (4) one-quarter circle curved pieces of metal or other material and fused together with four (4) ring male segments 21. In an alternative design the outer ring support 16 can be made from a plurality of straight or curved segments and bonded together by equal number of ring male segments 21. The outer support ring 16 may be integrated into the panel frame or be independent. The outer ring 16 can be formed of any of common metal materials or other common high-strength materials known to persons of ordinary skill in the art, including conductive or non-conductive materials. Such materials allow for torsional, vertical, and lateral support to the ring assemblies 10.

The ring male segments 21 also acts as attachment points for the vertical support structure 11. The ring male segments 21 are currently made from milled metal but could be manufactured by a variety of methods or commonly substitutable materials. Further, they can be welded or other mechanical attachment and used to secure the outer ring 16 support structure. The outer ring 16 can be drilled for spring, clamp, or other common means of connecting the solar panel 14 to the outer support structure 16. The photovoltaic (PV) solar panel 14 is held to spring attachment 17 at the panel outer spring attachment point 22. In a preferred embodiment, the panel outer spring attachment point 22 is a bolt but can also be any common attachment device commonly known in the art, and can be made of various metal materials or other high strength, non-conductive materials. The ring support rod 18 is secured to the collar 15 via the rod mount 23. The inner portion of the photovoltaic (PV) panel 24 is held in place by a spring attachment 17 connected at the inner panel attachment point 25, which connects the solar panel 14 to the inner ring to support pole collar 15. Alternatively, the panel 14 can be connected to the collar by other means providing for a secure attachment.

The inner ring to support pole clamp 23 can be bolted, welded or threaded to the vertical support structure in accordance with pole material and application. The solar panel 14 can include a plurality of individual monocrystalline solar cells 26. Bifacial monocrystalline, polycrystalline, laminate thin film or any other photovoltaic (PV) cell material can be used for the individual cells. The collar 15, ring support rod 18, and inner panel attachment point 25 can be built such that the solar ring assembly can be collapsed or retracted during periods of potentially damaging wind and later returned to its normal orientation. The collar 15, ring support rod 18, and inner panel attachment point 25 can be built such that the solar ring assembly 10 can act as a wind turbine and adjust individual panel orientation through the use of sensors, controllers, and motors to optimize overall energy production from both solar and wind. In this case, the components of the wind turbine would be housed within a shrouded area cut out from the vertical support structure.

Figure 3:
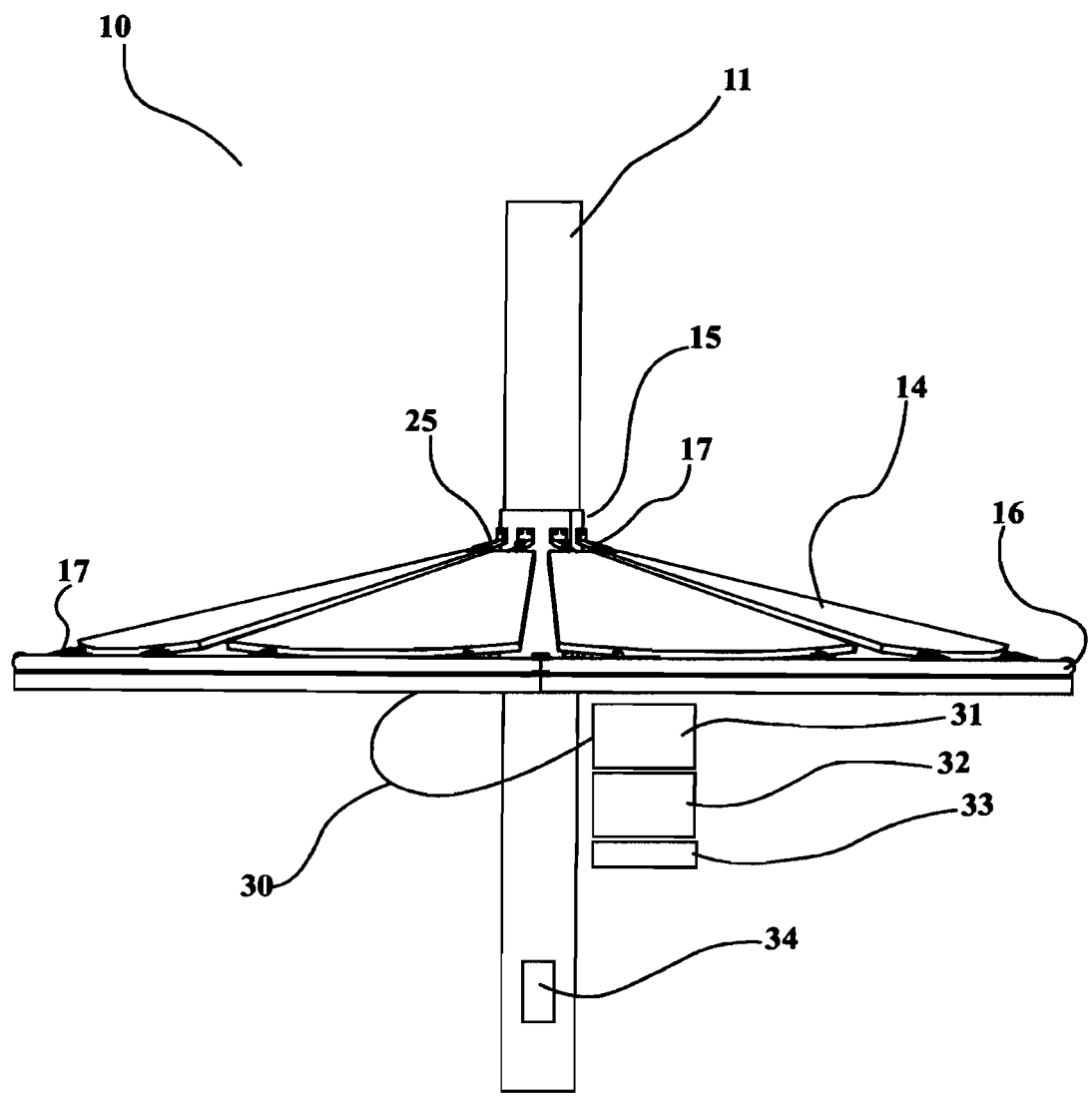
FIG. 3 is a side view of the upper portion of a solar ring assembly.

FIG. 3 is a side view of the solar ring assembly 10. The vertical support structure 11 is shown sectioned to allow greater scale to be shown for the solar ring assembly 10. The outer ring support 16 is seen in relation to the photovoltaic (PV) solar panel 14. The solar panels make direct current (DC) electricity that is conducted via combined direct current (DC) wires 30 to the DC charge controller and/or solar AC inverter 31. Wires 30 are shown externally but are anticipated to be routed internally in the vertical support structure or pole. Industry standard DC charge controller and/or solar AC inverter 31 can be used, which can then be software optimized for application in the solar ring assembly 10.

Communications equipment enclosure 32 holds the cell tower radios, the fiber optic converters, lighting controls and other peripheral controls or other peripheral AC or DC powered devices. The battery storage enclosure 33, can be industry standard pole attached or customized to the solar ring assembly 10. Further, the vertical support structure 11 can include an access hole and plate 34 where internal pole wiring is accessed. Providing a plurality of such access holes and plates 34 allows for greater ability for technical support.

To illustrate the wind load benefits of the solar ring assembly, it can be compared to a baseline solar panel installation on a tower featuring a panel of equivalent surface area to the solar ring assembly preferred embodiment, which has a total area from the eight pie-shaped panels. A single pie-shaped panel 14 has a surface area of 17.6 square feet (sq. ft). The baseline panel, then, has a surface area of 140.8 sq. ft. The wind load (or wind force) experienced by this structure is equal to the product of Wind Pressure, a drag Coefficient (Cd), and the Total Projected Area of the structure being studied. Total projected area is calculated by taking the sine of the inclination angle and multiplying that by the total surface area. Assuming the install location is at 30 latitude and the baseline panel is installed according to rooftop solar installation best practices, the panel inclination angle would also be 30 degrees.

The baseline panel would then have a total projected area of 70.4 sq·ft. The solar ring assembly 10 has a total projected area of 12.53 sq·ft in its preferred embodiment. In 150 mile per hour winds, the wind pressure would be 57.6 pounds per square foot. Drag coefficient Cd is equal to 1.28×the sine of the inclination angle. For the baseline panel, Cd is 0.64. Since the solar ring assembly inclination angle is 20 degrees in the preferred embodiment, its Cd is 0.438. Therefore, the force transmitted to the tower by the baseline panel would be approximately 2595 lb-ft whereas the solar ring assembly would transmit a maximum of 316 lbs. This is approximately 88% less force and does not take into account optional beveling of the panel frame or the dampening effect of the springs that attach the solar ring assembly's panels to the rest of the assembly.

Figure 4:
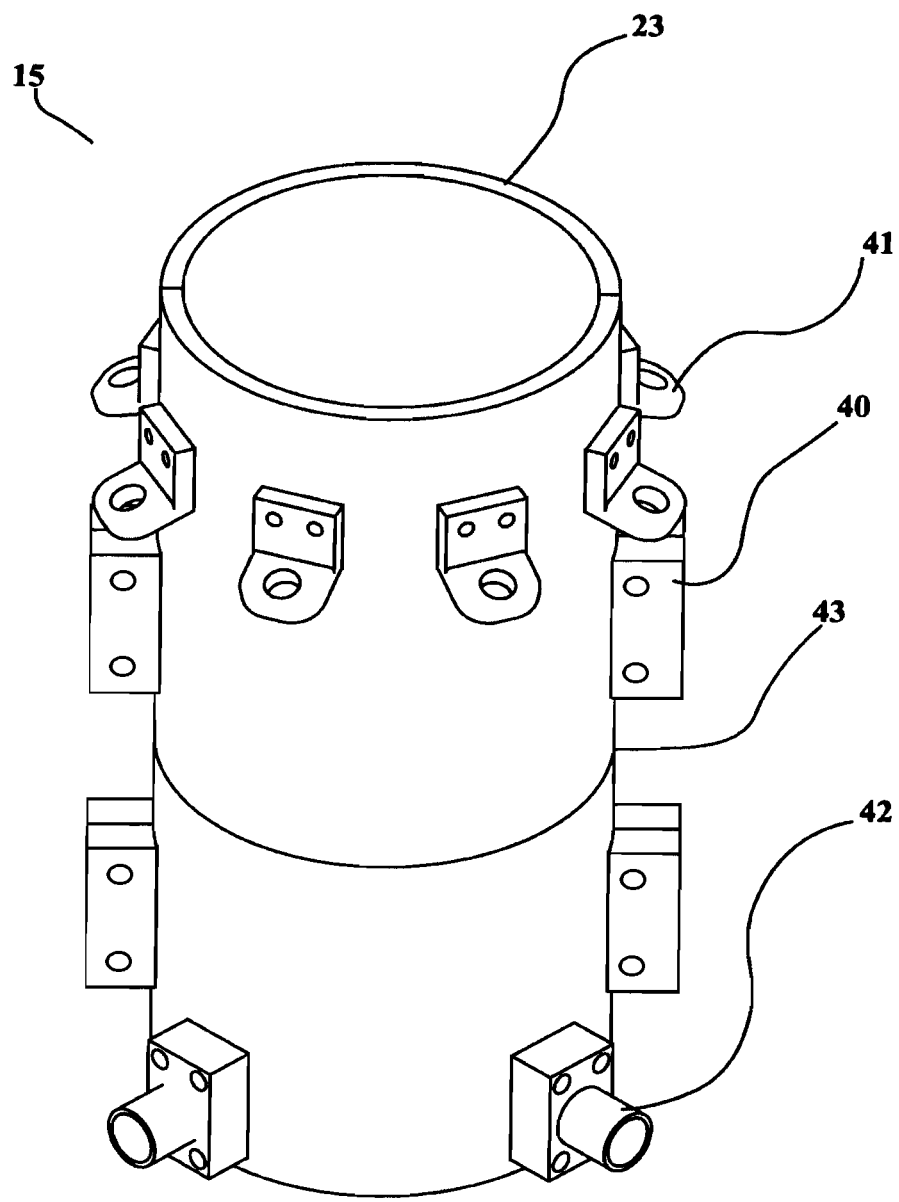
FIG. 4 is a top perspective view of a mounting collar for a solar ring assembly.

FIG. 4 is a perspective view of the collar 15, shown in one design as two (2) halves of curved metal which bolt together at the collar clamping tabs 40 to compress around the vertical support structure 11 (not shown here). In one embodiment the collar 15 includes an upper and lower half, separated by a bisection 43. By the collar 15 having independent upper and lower halves, the angle of tilt of the panels 14 can be adjusted. The bisection 43 also allows for the collar 15 to be adjustable to address situations of very high winds, allowing the panels 14 to be lowered to near horizontal and overlapping.

The interior surfaces of the inner rod mount 23 can be threaded or machined to match corresponding threads on the outer surface of the vertical support structure 11 allowing the solar ring assembly 10 to be attached via the collar 15 sub assembly as similar to a threaded nut and bolt. Secured to the collar 15 are a plurality of collar spring brackets 41. These brackets 41 act as the securing point for the spring attachments 17, spanning from the inner panel attachment point 25 to the collar spring brackets 41. Springs 17 used for securing panels to the vertical support structure 11 allow for improved wind tolerance and less peak stress on the solar panels 14. However, other forms of attachment can be used instead of the springs 17 described herein, such as flexible carbon fiber, elastic, flexible metal bands.

The collar 15 also includes a plurality of inner vertical support attachments 42, secured to the inner rod mount 23, which secure the inner end of the ring support rod 18. These inner vertical support attachments 42 provide mounting and support for the ring support rod 18 and outer support ring 16, and allow for vertical height adjustment, vertical, lateral and torsional support, as well as grounding and bonding to the ring structure. Furthermore, these can act as wire conduits junctions for the combined direct current wires 30. Collar clamping tabs 40 are intended to allow mechanical bolting of two sections of collar sub assembly together to make a contiguous 360-degree circular pole attachment collar 15. The collar 15 can be split at the bisection 43 and mounted to the vertical support structure 11 with a gap between the upper and lower portions of the collar 15 to accommodate varying size outer support rings 16 and/or to adjust the angle of the solar panels 14. The collar 15 can also be built as a hub on which the rest of the solar ring assembly 10 can rotate, allowing the assembly 10 to capture and store wind energy in addition to solar energy. In such an embodiment (not shown), the other necessary windmill components (shaft, gearbox, generator, etc.) can be positioned within a hollowed-out area within the vertical support structure 11.

Figure 5:
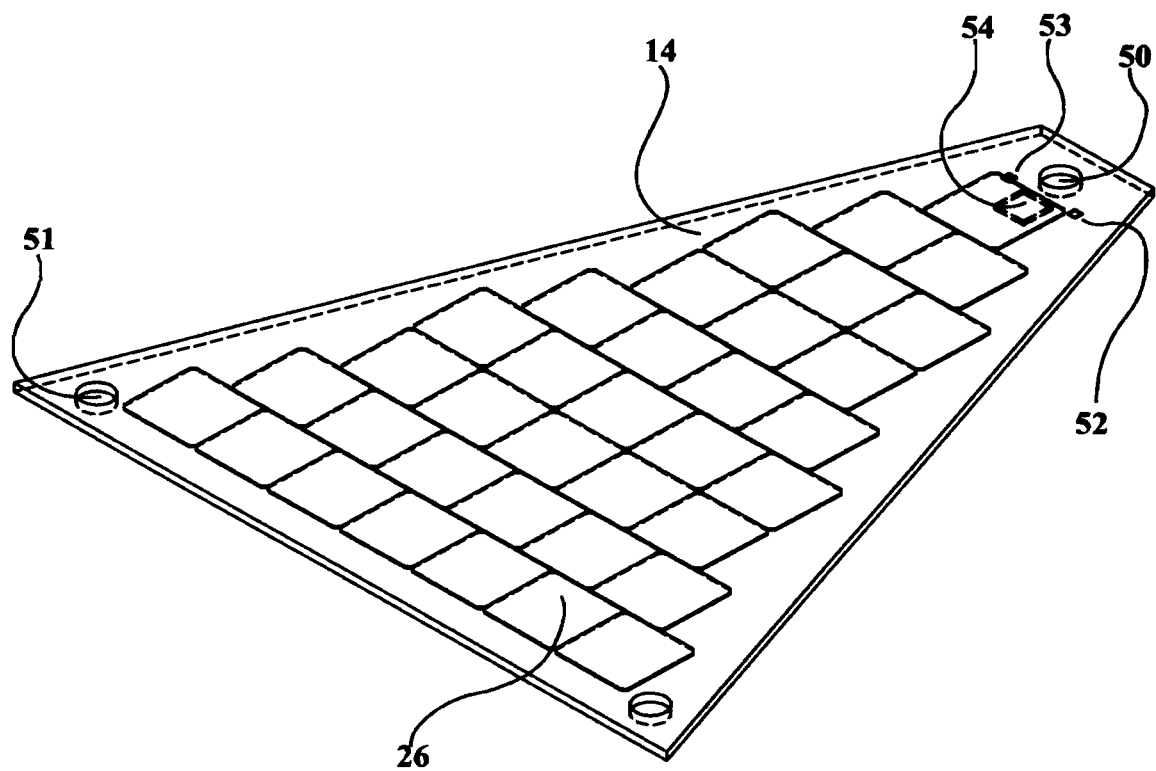
FIG. 5 is a perspective view of a triangular solar panel.
Figure 6:
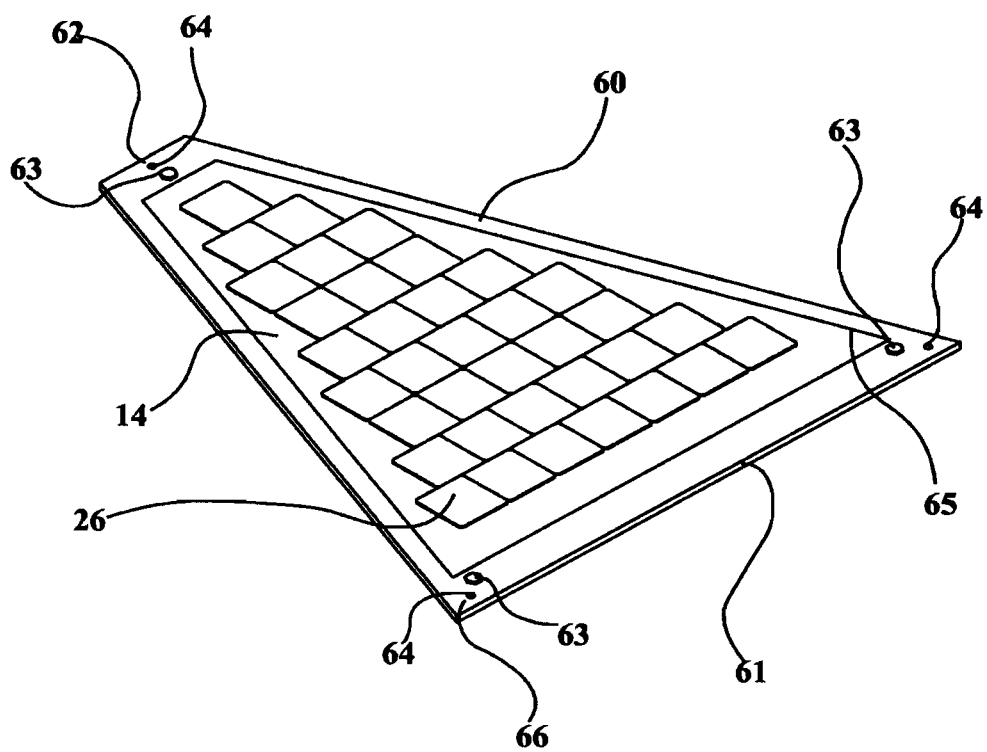
FIG. 6 is a perspective view of a triangular solar panel attached to a frame.

FIGS. 5 and 6 each show a single solar panel 14 shown in greater detail. While the solar panel 14 shown appear as trapezoids, as shown in other figures and described above the solar panels 14 can also be formed in pie-shaped pieces, or sectors. In the preferred embodiment, a plurality of the individual panels 14 form an up to a 360-degree array attached to a vertical support structure 11. Solar panels 14 can be made as trapezoids, triangles, pie-shapes/sectors, rectangles, quadrilaterals, or any other similar shapes. The solar panels 14 can be formed to have curved edges or surfaces. The solar panels 14 may include frames with mounting attachments, or alternatively, the solar panels 14 can be frameless with mounting holes manufactured into the panel. In the preferred embodiment the solar panels 14 are bifacial solar panels 14, which maximizes energy harvesting from light energy on both sides of the panels 14. The solar panels 14 can be made with glass or other transparent glazing type materials on the top and bottom sides.

Solar panels 14 can be made with a plurality of monocrystalline semiconductor cells 26, with polycrystalline, thin film, or any other current or future photovoltaic (PV) cell material. Panels 14 can be curved or arched from top to bottom for design or aesthetic reasons. Panels 14 can be frameless (FIG. 5), or alternatively, framed with metal or other rigid conductive or non-conductive materials (FIG. 6). The solar panels 14 can be flexible, cloth like, non-rigid material. The solar panels 14 have a positive DC electrical junction 52 and a negative DC electrical junction 53 with wiring connections (not shown), with or without a junction diode or fuse box (not shown). The solar panel 14 has a bottom side mounted micro inverter 54. In the frameless embodiment of the solar panels 14, shown in FIG. 5, the inner panel bolt hole 50 and outer panel bolt holes 51 are manufactured into the solar panels 14 themselves. Optional metal frame to glass connections can be adhesive or mechanical. Optimal design for framed or flexible applications have been envisioned and designed and not shown. Translucent glass or opaque substances can be integrated into the panels for non-energy harvesting areas. Light emitting diodes can be integrated between the sheets of glass during manufacture which will work as lighting or can act as decorations. Attachments may include rubber, metal or ceramic grommet to protect the solar panel, increase strength and durability. Grommets can help reduce the possibility of noise from solar panels to ring assembly connections. The panels and/or frame may have edge effects (such as beveling) to reduce drag and therefore the wind load on the structure.

FIG. 6 shows a solar panel 14 including a frame 60. In the disclosed embodiment the frame 60 is U-shaped to fit over the edges and the top and bottom faces of the solar panel 14. The frame 60 extends beyond the length of the panel 14 creating space for bolting together the four framed components and for the frame attachment points 20,25. The outer frame member 61 and the inner frame member 62 are also U-shaped metal that envelope the outer and inner edge. The panel frame 60 includes frame mount bolts 63 and holes 64 to which the attachment springs 17 can connect the panel 14 to the collar 15 and the outer support ring 16. Solar panels 14 can be made with monocrystalline semiconductor cells 26, with polycrystalline, thin film or any current or future photovoltaic (PV) cell material. Frames 60 can be made from metal or other rigid conductive or non-conductive materials. The frame 60 can connect to the glass of the panel 14 by common mechanical means or frame adhesive 65. Attachments may include rubber, metal, or ceramic grommets 66 to protect the solar panel, and to increase its strength and durability. Grommets 66 can help reduce the possibility of noise from solar panels to ring assembly connections. Frame 60 can be made metal or another suitably rigid non-metal material commonly known in the art, particularly non-corrosive, weather resistant materials. The frame 60 can be machined, forged, welded, mechanically or adhesive attached to the other frame edges 61,62 and to the solar panel 14. Though described herein as U-shaped, the frame 60 can also be made other shapes and sizes, with or without curvature of the panel 14, as commonly understood in the art. Including a frame 60 for the solar panel 14 increases the strength of the solar panel 14, while allowing the panel to have a lighter weight overall. Further, including a frame 60 increases the options for how to mount solar panel 14, including by allowing the panel 14 to be ridge mounted as opposed to spring mounted.

Figures 7A, 7B:
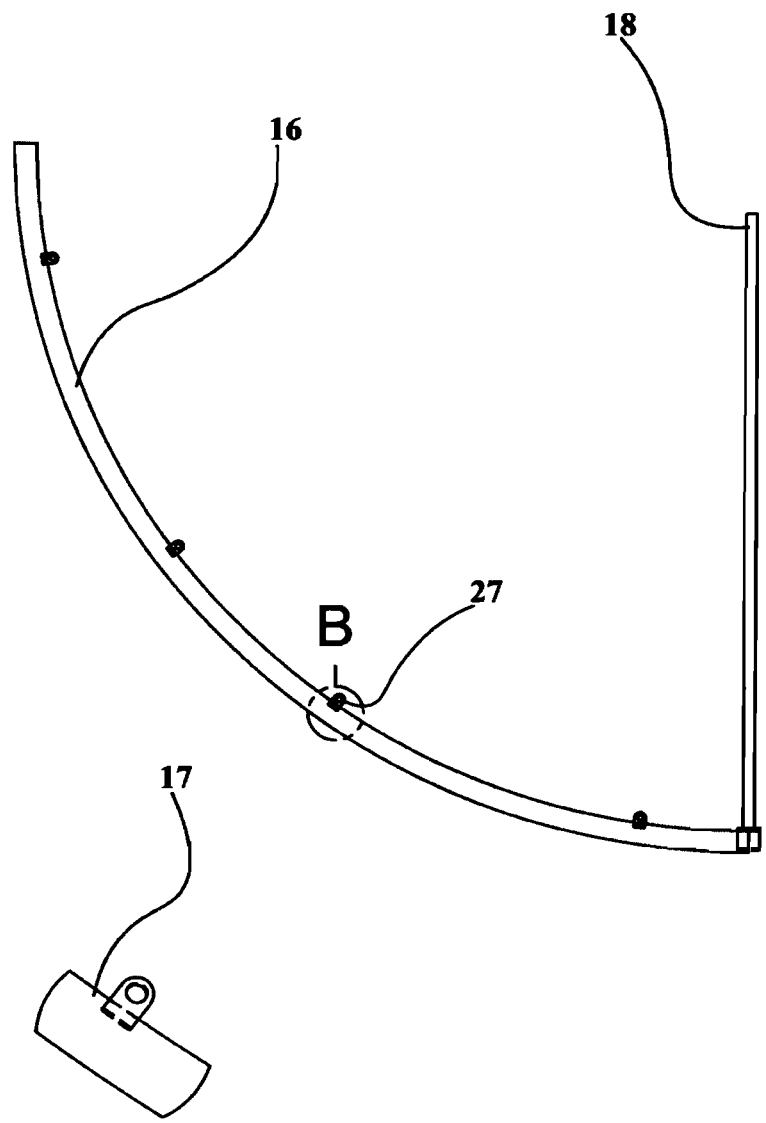
FIG. 7A is a partial top view of a ring sub-assembly for a solar ring.
FIG. 7B is a partial view of the ring sub-assembly of FIG. 7 taken along line A-A.

FIG. 7A shows a one-quarter section of sub-assembly the solar ring assembly 10, including which a portion of the outer support ring 16 and the ring support rod 18 which connects to the collar. As shown in FIG. 7A, and in greater detail in FIG. 7B, is the outer ring spring attachment point 27. Greater detail of the solar ring assembly allows assembly views necessary to construct this component of the preferred embodiment.

Figure 8:
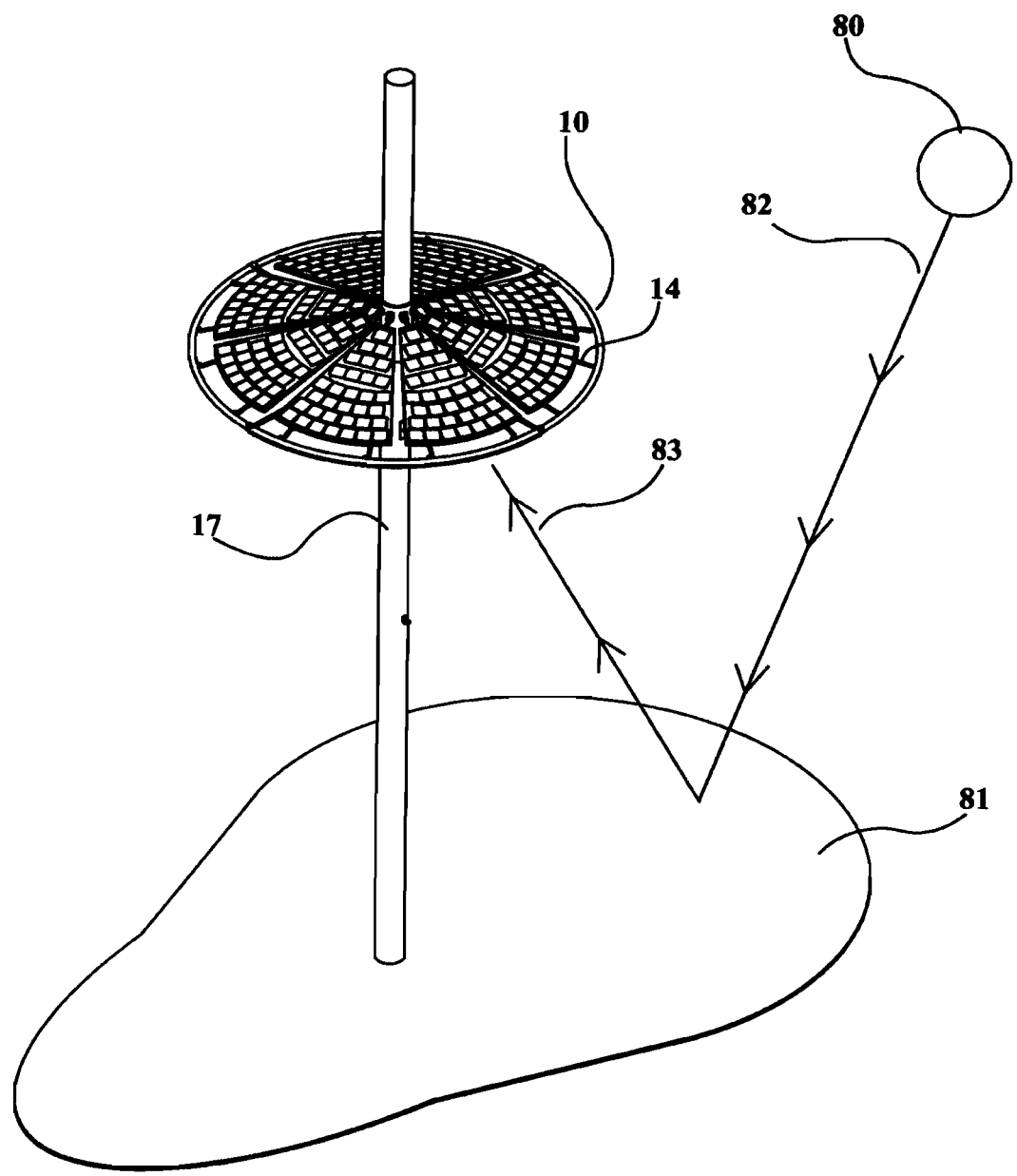
FIG. 8 is a perspective view of a solar ring assembly showing the ground reflective pattern.

FIG. 8 depicts the effects of reflective surfaces below the solar ring assembly 10. Reflective areas and properties of sunlight coming off of the reflective ground surfaces vary throughout the year. For example, the reflectivity and the angle of the reflected light coming towards the underside of the solar ring 10 change throughout the year. As discussed above, the preferred embodiment includes bifacial solar panels 14, so as to generate additional solar energy from the light being reflected back upwards to the underside of the solar ring assembly 10. Reflective mirrors, glazing, metallic paints or coatings, white aggregate or concrete bases can be used below the disclosed solar ring assembly 10 as reflective surfaces capable of increasing the energy harvesting ability of each bifacial solar panel 14. Increased year-round energy harvest production is therefore achieved by using the reflective base materials. As represented by FIG. 8, sun beams 82 coming from the sun 80 and hitting the primary reflector 81, reflect back upward to the solar ring assembly 10 as reflected sun beams 83. Using a primary reflector 81, such as a reflective paint applied to the native surface of the location around the vertical support structure 11 causes reflected sum beams 83 to be directed to the bottom surface of bifacial solar panels 14 the solar ring assembly 10 it thus increases the solar production of a bifacial. When using reflective paint, the shape on the ground can be optimized for the most gain and least paint used, based on the latitude of where the solar ring assembly 10 is installed, the shape of solar ring assembly 10 collector and the height above the ground the solar ring assembly 10 is installed. Optimization of the shape of the primary reflector 81 can then be calculated using math and optics principles, factoring in the sun's path each day of the year, the time of day, etc.

Figure 9:
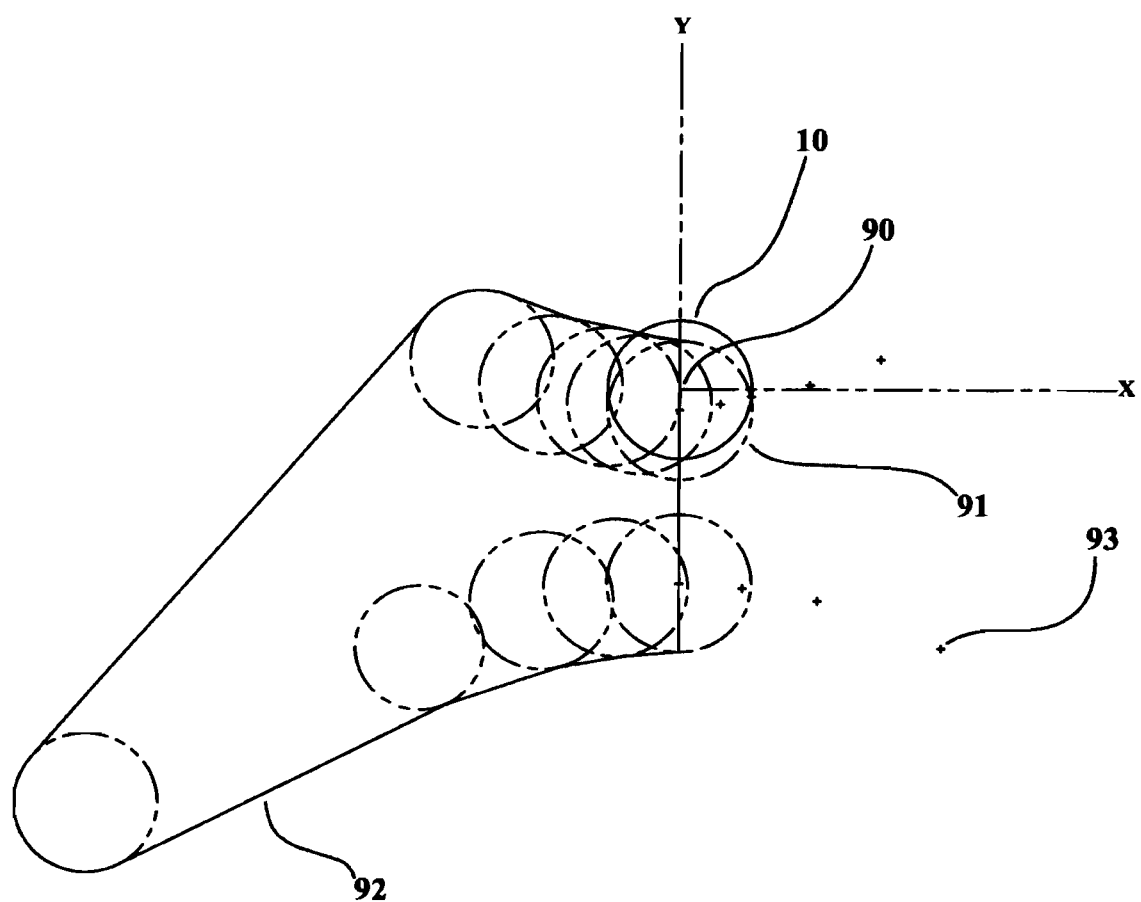
FIG. 9 Perspective view of a representation of the optimal ground reflective pattern for a given location.

FIG. 9 is a top view of a reflective ground pattern each afternoon hour on the longest & shortest day of the year, depicting the reflective areas and light properties on the reflective ground surface area during different times of the year. The reflectivity changes, as does the angle of the reflected sunlight towards the underside of the solar ring. The height and mounting location on the Earth's surface will change the shape and path of this reflective property throughout the year, as will the materials used below the solar ring assembly for reflectivity.

FIG. 9 is a sun reflection pattern of specific shape and size. At the X, Y intersection is the center point 90 of the solar ring assembly 10. The dot-dash circles below the center point 90 of the solar ring assembly 10 represents the reflective ground pattern 91 optimized for reflecting the sun beams 82 at noon on June 21 of each year at a specific latitude, and therefore enhancing the energy harvesting by the solar ring assembly 10. Since the solar ring assembly 10 is a circle in this embodiment, the optimal reflection pattern would also be a circle around the reflection center point. Each specific dash-dot circle moving in the negative x direction represents the optimal reflective ground pattern 91 successive hours, e.g., 1:00 pm, 2:00 pm, etc. until 4 pm of a given day, which can be used to identify the optimal reflectivity pattern to use to maximize solar energy harvesting throughout the day. The second group of circles, shown in FIG. 9 further down in the negative Y direction and moving in the negative X direction, represent the optimal reflective ground pattern from noon to 4 pm on December 21 each year. The pattern for the year from noon to 4 pm is defined by the outer line and creates the yearly optimal reflective ground pattern 92 based on sun locations relative to the solar ring assembly during the second half of each day. Plus signs 93 represent the location for the center points for the reflective ground patterns 91 for the morning sun pattern.

The pattern can be adjusted to the operation time needed. The distance (D) from the center mounting point X, Y of the solar ring assembly 10 to the center point of reflection is calculated by dividing the height of the panel by the tangent of the sun elevation angle. The angle of the reflection is the Azimuth of the sun at a specific time. To produce a grid of reflection points the distance D and Azimuth of the sun can be used from the solar ring assembly 10 center mounting point, or alternatively the x and y coordinates from the umbrella center mounting point can be calculated. The X-coordinance can be calculated by multiplying the distance D times the cosign of the quotient of pi times the difference of 90 minus the Azimuth all divided by 180. Expressed as: X-coordinance=D*Cos ($\pi$*(90−Azimuth)/180). The Y-coordinance can be calculated by multiplying the distance D times sine of the quotient of pi times the difference of 90 minus the Azimuth all divided by 180. Expressed as: Y-coordinance=D*sin ($\pi$*(90−Azimuth)/180). A plot of the (x,y) coordinance for the center reflective point for December 21, the shortest day of the year, and June 21 the longest day of the year at a latitude of 30 degrees is seen in FIG. 9 using this method. Specific ground treatments, such as reflective paint, and patterns can be calculated for specific locations. The reflective patch can be designed specifically to each specific solar ring assembly 10 with parameters based on latitude and longitude, height and diameter of the absorbers, the solar ring assembly 10. Providing these location specific patterns of reflective material below a solar ring assembly 10 increases energy production efficiency of the solar ring, increasing the amount of energy collected at a given cost.

A tall utility pole will typically have the solar ring assembly positioned high above the ground, proving a lot of surface area below the assembly. Carving into the outer surface, even only a few millimeters deep, can create a sawtooth-shaped or threaded pattern of rings around the pole, which provides a series of mirrored/reflective surfaces having similar properties to a Fresnel mirror. Including such angled cuts can increase the production of the solar panels by increasing the reflectivity below the solar ring assembly.

A Fresnel lens is a type of composite compact lens. It allows for a large aperture and a short focal length. A Fresnel lens can be made much thinner than a conventional lens. A reflector uses a similar principle, where the surface is divided into many surfaces and each surface can have different angles of incidence thereby causing a large surface to focus on a smaller space. The large surface area of the pole affords a large reflective surface, and if designed and built correctly, can increase the solar ring assembly 10 production significantly.

FIG. 10A is a side elevation view of a utility pole with a plurality of Fresnel reflectors 100 carved into the outer surface of the vertical support structure 11 below the solar ring assembly 10. The plurality of Fresnel reflectors 100 disclosed in FIG. 10 is the embodiment of sawtooth-shaped cuts, shown in greater detail in FIG. 10B, where each individual sawtooth-cut Fresnel reflector 101. As shown, the reflected sun beams 83 are reflected up to the solar ring assembly 10 from the plurality of Fresnel reflectors 100. These series of reflectors 100, positioned below the solar ring assembly 10 reflect the sun energy to the bottom surface of the bifacial solar panels 14, enhancing the solar energy collection.

The shape of the sawtooth cuts, or threaded cuts, can be optimized to increase vertical reflection to the solar ring assembly 10. In an optimal embodiment, each ascending cut in the pole is at a slightly different angle based on its relative height compared to the solar ring assembly 10. A pole that is tapered and wider at the bottom has significantly more surface area and improves the surface area of the reflective angle and thus provides a better surface area for a plurality of Fresnel reflectors 100. A square pole, and square-tapered pole (e.g., square pyramid) have even better properties for a plurality of Fresnel reflectors 100 to the bifacial solar panels 14. A variety of other shape poles (e.g., triangular, elliptical, conical, etc.) also offer specific advantages for bifacial solar mounted on a pole.

An alternative to cutting into the outer surface of the vertical support structure to create a plurality of Fresnel reflectors 100 is to wrap the lower portion of the vertical support structure with a Fresnel-type reflector that has the same (or similar) function of reflecting sun beams up to the solar ring assembly 10. The solar ring assembly 10 is optimized when paired with some form of Fresnel reflector. The pole can be machined as described above or it can be pitched to use the lens-reflector effect as pole threading used to mount the solar ring assembly or any other attachment desired. If using a cylindrical pole, threading the outer surface can create a highly-reflective threaded bolt that acts as a reflector can be achieved, and allows for attachment to the surface on the threads. Poles can be manufactured or machined for desired effect using corrosion resistant metal, composites, or other rigid materials. The size, number, pitch, height, and width of cuts or threads on the pole surface can vary based on the size and needs of the application. Anodization, stainless steel, polishing, chrome plating, reflective paints, coatings or metallic powder coat finishes may be used as well to reach the desired look and level of reflectivity. Threading provides the additional benefit of easy installation and height adjustment of the solar ring assembly or any other devices attached to the vertical pole support.

In a preferred embodiment, the surface-mounted poles include a base assembly for attaching them to the ground. This base assembly generally includes the pole/tower and the reflector as wide as desired to reach the desired energy harvest. The base can be reflective metal, coated metal, composite, or any other rigid material which is, or can be made, reflective. Other examples of materials for base include reflective concrete, coatings, paint, chrome, aluminum, white aggregate or any other lightly colored reflective material. Further, the base can be integrally formed with to the pole/tower or it can be a separate assembly that is attached to the vertical support structure (e.g. pole/tower). Reflective enhancements to the vertical support structure, combined with the solar ring's bifacial solar panels and shape allows the solar ring assembly to achieve superior solar energy harvesting on new or existing infrastructure.

Figure 11:
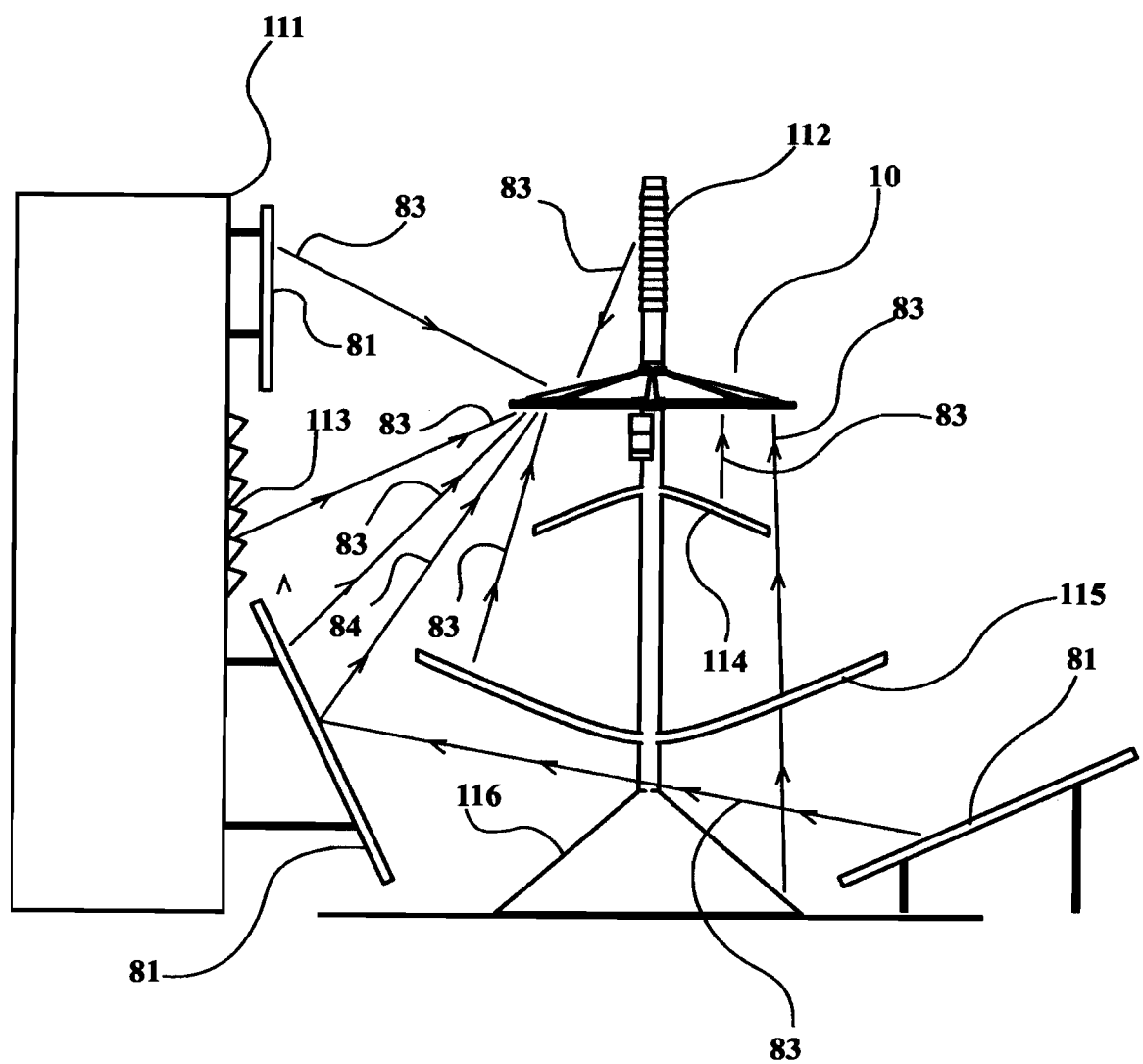
FIG. 11 is a side view of solar ring assembly with optional additional reflectors.

FIG. 11 discloses a solar ring assembly 10 and multiple primary reflector 81 options/types which are compatible with the solar ring assembly 10 to enhance energy collection. These options can help improve solar collection in urban or dense areas where solar access may be limited or otherwise not ideal for maximum collection. Further, multiple of the same or different types of primary reflectors 81 can be used to complement each other or any other reflective-type device or material. The use of one or more primary reflectors 81 maximizes the energy collection from the bifacial solar panels 14. In dense/urban environments, similar increases can be gained through the use of reflective window glazing, films, or materials on adjacent buildings/structures. This would allow for increased energy harvest without adding mounts, brackets, or stand-alone reflectors. As seen in FIG. 11, the reflected sun beam 83 are shown reflecting of the various primary reflectors 81 back to the solar ring assembly 10.

As shown, a primary reflector 81 can be secured to a neighboring structure 111, in various ways, so as to direct reflected sun beams 83 back to the solar ring assembly 10. Further, the portion of the vertical support structure 11 above solar ring assembly 10, can include one or more reflectors 112, which can be Fresnel reflectors, flat, or faceted, or alternatively they can be fixed or tracking reflectors. Faceted tracking reflectors are presently believed to be the most cost efficient and productive reflectors.

In an alternate application a fixed primary reflector 81 can be attached to a structure below the solar ring assembly 10. The resulting reflected sun beams 83 are then directed back to the solar ring assembly 10. These reflectors 81 can be flat or faceted, and can be fixed or tracking. Alternatively, Fresnel reflectors 113 can be mounted on nearby structures 111 to provide additional reflectivity back to the solar ring assembly 10.

Additionally, a fixed reflector 114 can be attached to the support structure 11 below the solar ring assembly 10, directing reflected sun beams 83 up towards the solar ring assembly 10. The fixed reflector 114 below the solar ring assembly 10 reflector can be conical, flat, or faceted, and can be fixed or tracking. A four-sided pyramid shape would be the most cost efficient and productive. It can also be a Fresnel design. Tracking pyramid reflectors would also increase production.

Further, a parabolic reflector 115 can be attached to the vertical support structure 11 below the solar ring assembly 10, directing reflected sun beams 83 up towards the solar ring assembly 10. The parabolic reflector 115 can be flat or faceted and can be fixed or tracking. Tilting a parabolic reflector 115 towards the South will increase the energy collection and result in a more cost-efficient addition to the solar ring assembly 10. The parabolic reflector 115 can also include a Fresnel design. A tracking parabolic reflector 115 can also be employed to increase solar energy collection, employing known tracking systems.

Similarly, a fixed base reflector 116 can be attached at the base of the vertical support structure 11 at ground level below the solar ring assembly 10, directing the reflected sun beams 83 upwards to the solar ring assembly 10. The fixed base reflector 116 can be conical, flat or faceted, and can be fixed or tracking. A four-sided pyramid shape would be the most cost efficient and productive. The fixed base reflector 116 can also include a Fresnel design. A tracking base reflector 116 can also be employed to increase solar energy collection by the solar ring assembly 10, utilizing known tracking systems.

As seen in FIG. 11, any combination of reflectors can be utilized with the solar ring assembly 10, and by doing so, some reflected sun beams 83 will be directed to one of the other reflectors so that secondarily reflected sun beams 84 are directed to the solar ring assembly 10 as shown.

Figure 12:
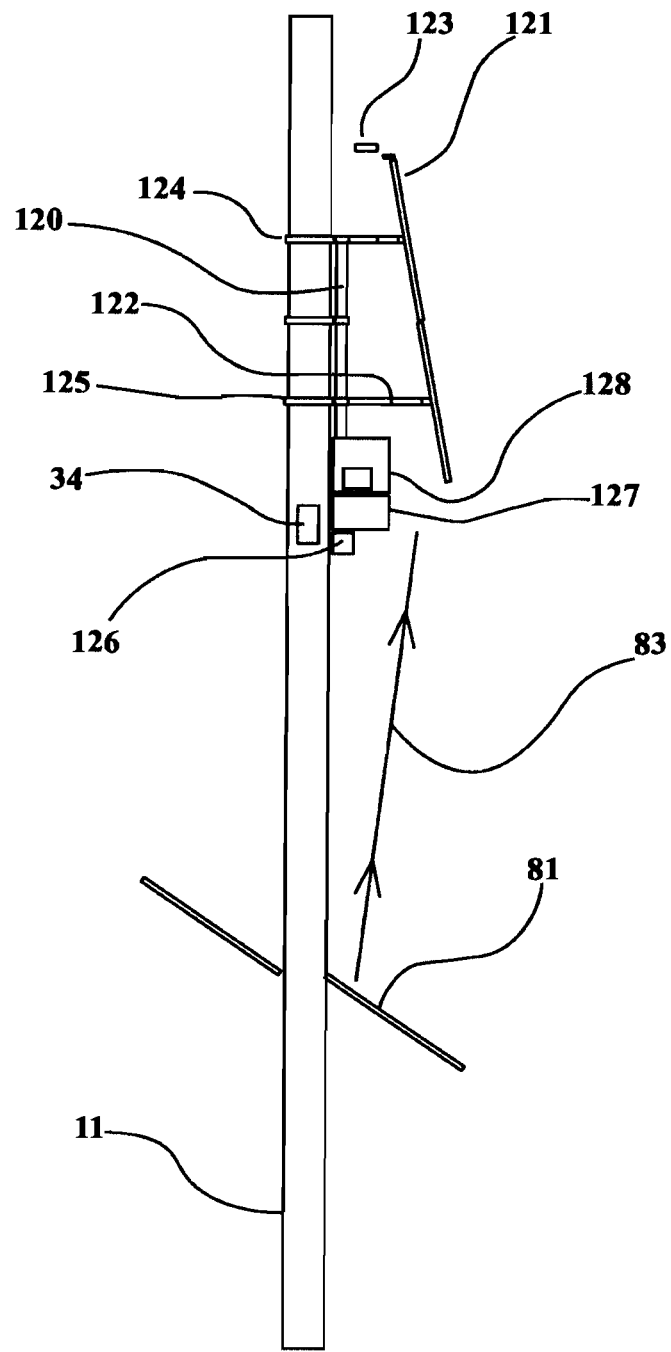
FIG. 12 is a side view of a solar tracker assembly.

FIG. 12 shows a side view of a solar tracker assembly, showing how even standard bifacial solar panels can be enhanced by combining with the primary reflectors 81 discussed above. The vertical support structure 11 has a variation of a collar support to support the vertical axle assembly 120 which, in turn, holds up the solar panel array assembly 121. The solar panel array assembly 121 includes one or more solar panels of any traditional standard solar bifacial panels in current or future production. The bifacial tracking array can have a mid-pole attachment or a base attachment of one of the primary reflectors 81 (or alternatively fixed reflectors, parabolic reflectors, or base reflectors), as discussed in the context of FIG. 11. An efficient reflector would be of similar size and shape to the solar panel array assembly and which tracks the same sun angle as the panel's tracking, reflecting to the bottom of the solar panels. A solar panel array assembly 121 can be wired in series or parallel to in various wattages and numbers of panels. The solar panel array assembly can be used to harvest solar power and act as a pole-mounted tracker to make use of active solar tracking on vertical support structures. Solar panels are mounted to railing 122 attached to the tracker assembly 121. The photocell and controller 123 evaluates the sun position and adjusts the tracking mechanism used to follow the sun's path across the sky and send control data to adjust the movement of the tracker throughout the day to maximize solar energy harvest from the solar panels. Solar tracker pole upper mount attachment 124 and solar tracker lower mount 125 attach the solar panel array assembly to the vertical support structure.

Consistent with known solar tracking assemblies the solar panel array assembly 121 is moved by gears, cables, pneumatically or hydraulically driven by on-board controls to move the panel array around the pole to follow the path of the sun. The assembly 121 includes a controller 126 and an electronics storage compartment 127, which houses inverters, charge controllers, batteries, lighting controls, or all the above. The tracking drive motor 128 can drive the mechanism by belt or direct drive gearbox.

The panels of the solar panel array assembly 121 face nominally South and tilt upwards and are rotated from East to West from sunrise to sunset. The optional additional primary reflectors 81 can be mounted below the solar panel array assembly 121 in the figure and are detailed in FIG. 11. Additionally, the assembly 121 can be made an active solar tracker using weight displacement-type methods, such as underside tanks, transfer tubing for freon and a simple sundial type shading device above the tracker mechanism. A freon radiator, tank assembly can be used similarly to a thermosiphon, whereas the liquid freon heats up and changes from a liquid to a gas during the sun's path across the sky. This gradual change in freon state and weight through the sun's rise and fall via solar thermal energy can be used to shift a solar ring or solar panel array assembly weight and associated pitch throughout the day to match and track the sun's path across the sky in any season. During night hours, after sunset, the freon fully cools back to a liquid state, thereby shifting the weight and resetting the tracker towards the east for the next sunrise. Additional methods and substances may be used in a similar fashion. This option using existing technology when combined with the solar ring assembly on a pole top pivot can allow solar tracking to increase energy harvest potential, without the use of electronics, hydraulics, motors, mechanical gears or controls.

Figure 13:
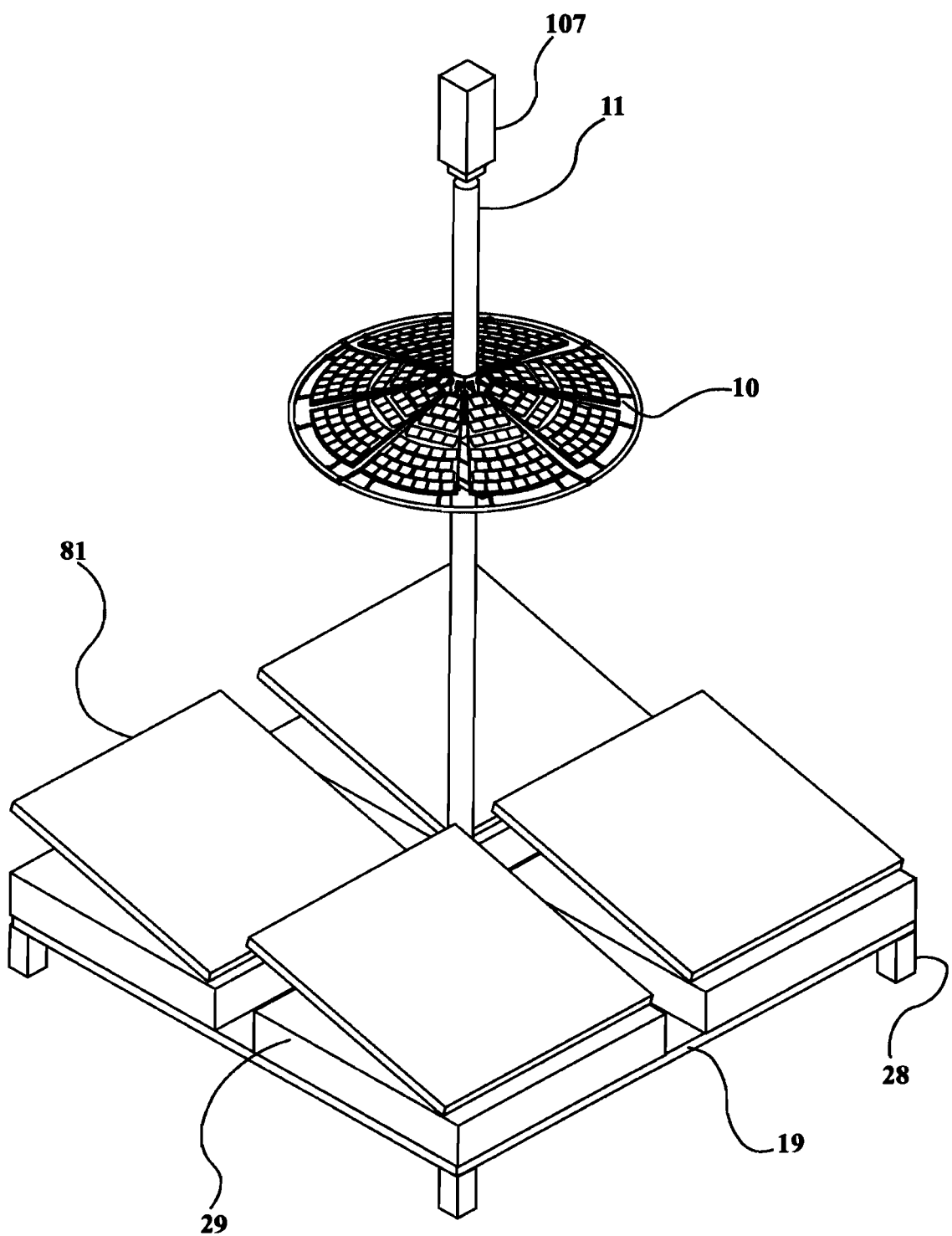
FIG. 13 is a perspective view of a solar ring assembly mounted on top of a ballasted pole.

As seen in FIG. 13, instead of being secured to the ground, a solar ring assembly 10 on a vertical support structure 11 can be secured to a large and heavy base 19. As shown, in one embodiment the base 19 includes four feet 28 with no ground foundation. This embodiment allows a solar ring assembly 10 with antenna 107 to be erected at temporary locations, locations where the vertical support structure 11 cannot be inserted into the ground, such as where tree roots cannot be disturbed, or no foundation can be built. A base 19 that stands on feet 28, would be designed heavy enough to not move and wide enough to not tilt with the wind. May locations that need solar power, such as to power radio antennas 107, do not need or cannot take advantage of traditional foundations. The embodiment disclosed includes a wide base 19 which is weighted down with concrete blocks 29 to provide sufficient weight. The surface can be covered with one or more primary reflectors 81 or optional additional solar panels mounted below the solar ring assembly 10 to increase the production of the solar ring assembly 10.

In another embodiment, the outer support ring would be formed of a flexible material, including high tensile strength fabrics, so that the solar ring assembly can collapse similar to an umbrella repositioning the solar panels against the outer surface of the vertical support structure, by moving the upper and lower halves of the collar assembly away from each other. In such an embodiment, the ring support rod is pivotably coupled to both the collar and the outer support ring. The separation of the upper and lower halves of the collar can be mechanically controlled, including by having a displacement rod connecting the two collar halves, where the displacement rod is fixed to one half and coupled to a gear on the other half so as to control the movement of the displacement rod relative to the gearing.

Figure 14:
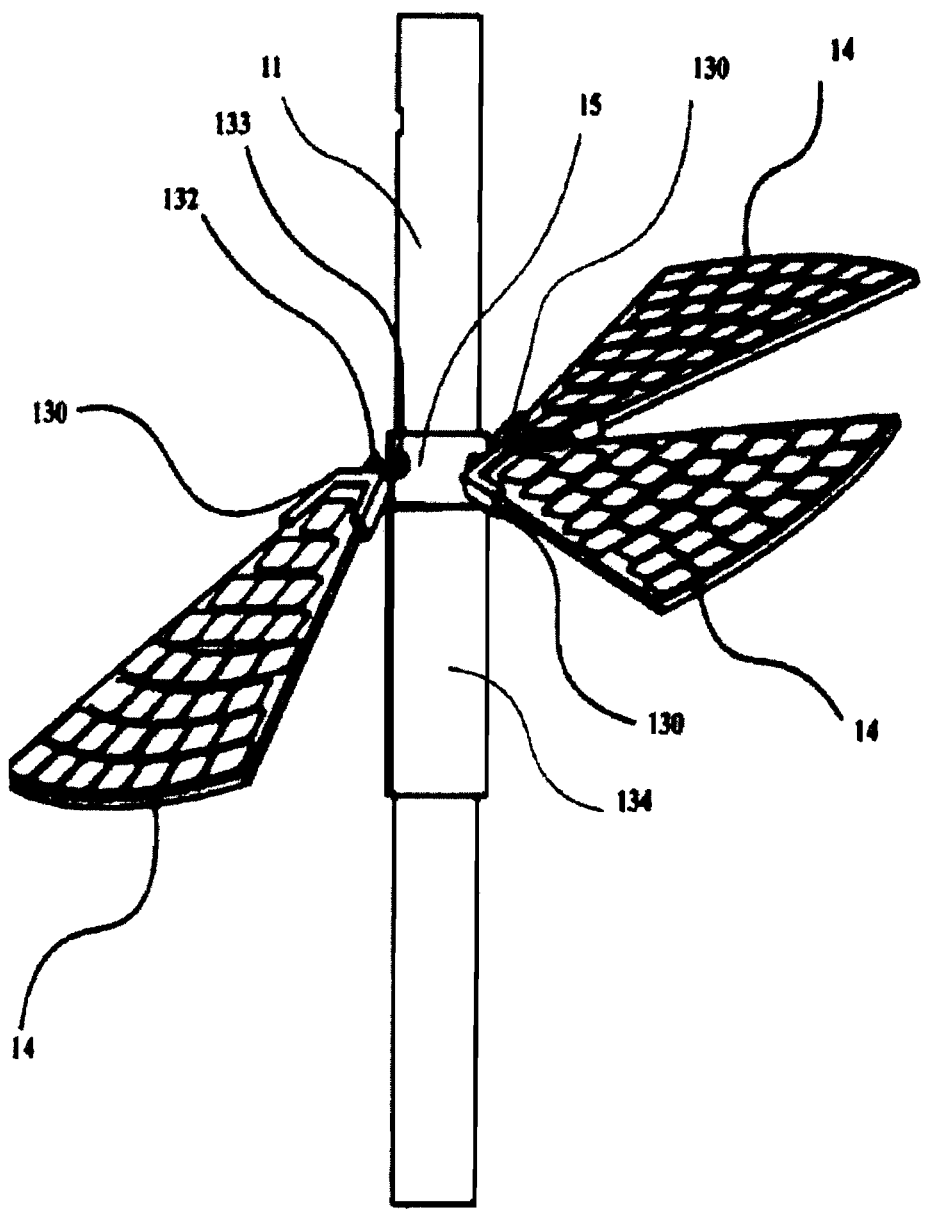
FIG. 14 is a perspective view of articulated panels.

FIG. 14 is a side perspective view of an embodiment of the solar ring assembly 10 in which a plurality of solar panels 14 can be partially rotated about the z and y axes by motors 132 and 133. In this embodiment, the end of each panel 14 that is adjacent to the tower 11 is held by a rigid frame assembly 130 that can be constructed from any type of weather resilient material. The panel 14 can be affixed to the frame assembly 130 via adhesive, by use of bolts and through holes, use of a clamping mechanism, or other fasteners. The frame assembly 130 is connected to the collar 15 by weldment or bolts and has one motor 133 that rotates the panel about the z axis so that it can fold down when not in use or during inclement weather conditions or fold up to collect more sunlight at certain times of the day. The frame assembly 130 is connected to a motor 132 that can rotate the panel about the y axis to improve collection of sunlight at certain times of day. Each panel 14 would be fitted with independent motors 132 and 133 which can be stepper, servo or other commonly available types of motors. Motors 132 and 133 are controlled by electronics located within the profile of the tower 11 in a shrouded control unit 134.

The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims.

What is claimed is:

1. A solar ring assembly comprising:
    a collar, said collar including an inner mounting surface and an outer surface including at least one collar attachment bracket and at least one inner support attachment, said collar comprises an upper half spaced apart from a lower half, and wherein said at least one collar attachment bracket is coupled to said collar upper half and at least inner support attachment is coupled to said collar lower half,
    an outer support ring constructed from a flexible material, said outer support ring including at least one attachment point and at least one outer support attachment,
    at least one support rod, said at least one support rod having a first end and a second end, said first end of said at least one support rod coupled to said at least one inner support attachment, said second end of said at least one support rod coupled to said at least one outer support attachment, wherein said at least one inner support attachment is pivotally coupled to said at least one support rod first end so that said at least one support rod can pivot between a horizontal position and a vertical position, and
    at least one bifacial solar panel, said at least one bifacial solar panel having a first end and a second end, said first end of said at least one bifacial solar panel coupled to said at least one collar attachment bracket, said second end of said at least one bifacial solar panel coupled to said outer support ring at least one attachment point, wherein said bifacial solar panel first end is flexibly coupled tO said at least one collar attachment and said bifacial solar panel second end is flexibly coupled to said at least one outer support ring at least one attachment point, said at least one bifacial solar panel electrically coupled to a battery for storing solar energy;
    wherein said collar is configured to attach to a vertical structure to position said solar ring assembly vertically above ground level whereby an upper surface of said bifacial solar panel collects direct sunlight and a lower surface of said bifacial solar panel collects reflected sunlight.

2. The solar ring assembly of claim 1 wherein said bifacial solar panel first end is flexibly coupled to said at least one collar attachment and said bifacial solar panel second end is flexibly coupled to said at least one outer support ring at least one attachment point.

3. The solar ring assembly of claim 2 further comprising a first spring and a second spring, said first spring having a first end and a second end, said first spring first end coupled to said at least one collar attachment, said first spring second end coupled to said bifacial solar panel first end, said second spring having a first end and a second end, said second spring first end coupled to said bifacial solar panel second end, said second spring second end coupled to said at least one outer support ring at least one attachment point.

4. The solar ring assembly of claim 1, wherein said at least one bifacial solar panel includes a frame.

5. The solar ring assembly of claim 4, wherein said frame is constructed from a material selected from the group consisting of aluminum, stainless steel, alloy, poly, fiberglass, or carbon fiber.

6. The solar ring assembly of claim 1, further comprising a primary reflector, wherein said primary reflector is constructed and arranged to reflect solar energy to said solar ring assembly.

7. The solar ring assembly of claim 6, wherein said solar ring assembly is coupled to an outer surface of a vertical support structure, and wherein said primary reflector is formed on said outer surface of said vertical support structure.

8. The solar ring assembly of claim 6, wherein said solar ring assembly is coupled to an outer surface of a vertical support structure and said primary reflector is coupled to said outer surface of said vertical support structure.

9. The solar ring assembly of claim 1 wherein said at least one bifacial solar panel is electronically coupled to an antenna.

10. The solar ring assembly of claim 1, further including a means to off load power strain on a power grid during peak hours of power consumption electrically coupled to said solar ring assembly.

11. The solar ring assembly of claim 1, wherein said outer support ring forms a continuous sidewall encircling said collar.

12. The solar ring assembly of claim 11 wherein said at least one solar panel is a plurality of solar panels which form a continuous solar panel encircling said collar.

* * * * *